US012363765B2

(12) United States Patent
Cariou et al.

(10) Patent No.: US 12,363,765 B2
(45) Date of Patent: Jul. 15, 2025

(54) APPARATUS, SYSTEM, AND METHOD OF SUSPENDING A WIRELESS COMMUNICATION

(71) Applicant: Intel Corporation, Santa Clara, CA (US)

(72) Inventors: Laurent Cariou, Milizac (FR); Juan Fang, Portland, OR (US); Thomas J. Kenney, Portland, OR (US); Minyoung Park, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 693 days.

(21) Appl. No.: 17/559,959

(22) Filed: Dec. 22, 2021

(65) Prior Publication Data

US 2022/0116990 A1 Apr. 14, 2022

(51) Int. Cl.
*H04W 74/0833* (2024.01)
*H04W 74/08* (2009.01)
*H04W 76/19* (2018.01)

(52) U.S. Cl.
CPC ..... *H04W 74/085* (2013.01); *H04W 74/0866* (2013.01); *H04W 76/19* (2018.02)

(58) Field of Classification Search
None
See application file for complete search history.

(56) References Cited

U.S. PATENT DOCUMENTS

| 2021/0212156 | A1* | 7/2021 | Kwon | H04W 76/34 |
| 2021/0266891 | A1 | 8/2021 | Chu et al. | |
| 2023/0308938 | A1* | 9/2023 | Sun | H04W 28/0278 |
| 2023/0309169 | A1* | 9/2023 | Klein | H04W 76/15 |

FOREIGN PATENT DOCUMENTS

EP 3 846 574 7/2021

OTHER PUBLICATIONS

Search Report for European Patent Application No. 22199755.4, mailed on Apr. 17, 2023, 14 pages.
(Continued)

*Primary Examiner* — Christine T Duong
(74) *Attorney, Agent, or Firm* — Shichrur & Co.

(57) ABSTRACT

For example, an apparatus may be configured to cause an Access Point (AP) Multi-Link Device (MLD) to, during an ongoing communication between a first AP of the AP MLD and a first non-AP wireless communication station (STA) over a first wireless communication channel, communicate a suspend request by a second AP of the AP MLD over a second wireless communication channel, the suspend request configured to request suspension of the ongoing communication between the first AP of the AP MLD and the first non-AP STA; to suspend the ongoing communication between the first AP of the MLD and the first non-AP STA over the first wireless communication channel for a suspension period; and to communicate a frame by the first AP over the first wireless communication channel during the suspension period, the frame communicated between the first AP and a second non-AP STA.

25 Claims, 12 Drawing Sheets

(56) References Cited

OTHER PUBLICATIONS

Abhishek Patil (Qualcomm): "Multi-Link Operation—Link Management", IEEE Draft; 11-19-1528-05-00BE-Multi-Link-Operation-Link-Management, IEEE-SA Mentor, Piscataway, NJ USA, vol. 802.11 EHT; 802.11be, No. 5, Jan. 16, 2020 (Jan. 16, 2020), pp. 1-22, XP068165459, Retrieved from the Internet: URL:https://mentor.ieee.org/802.11/dcn/19/ 11-19-1528-05-00be-multi-link-operation-link-management.pptx, [retrieved on Jan. 16, 2020].

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

* cited by examiner

Reuse 7 deployments

APPARATUS, SYSTEM, AND METHOD OF SUSPENDING A WIRELESS COMMUNICATION

TECHNICAL FIELD

Embodiments described herein generally relate to suspending a wireless communication.

BACKGROUND

Some wireless communication networks may utilize a channel access mechanism to share a wireless communication medium for transmissions by multiple devices.

For example, a device may implement a Clear Channel Assessment (CCA) mechanism to determine whether the wireless communication medium is busy, for example, before attempting a transmission over the wireless communication medium.

There is a need for technical solutions to provide increased and/or efficient access to the wireless communication medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
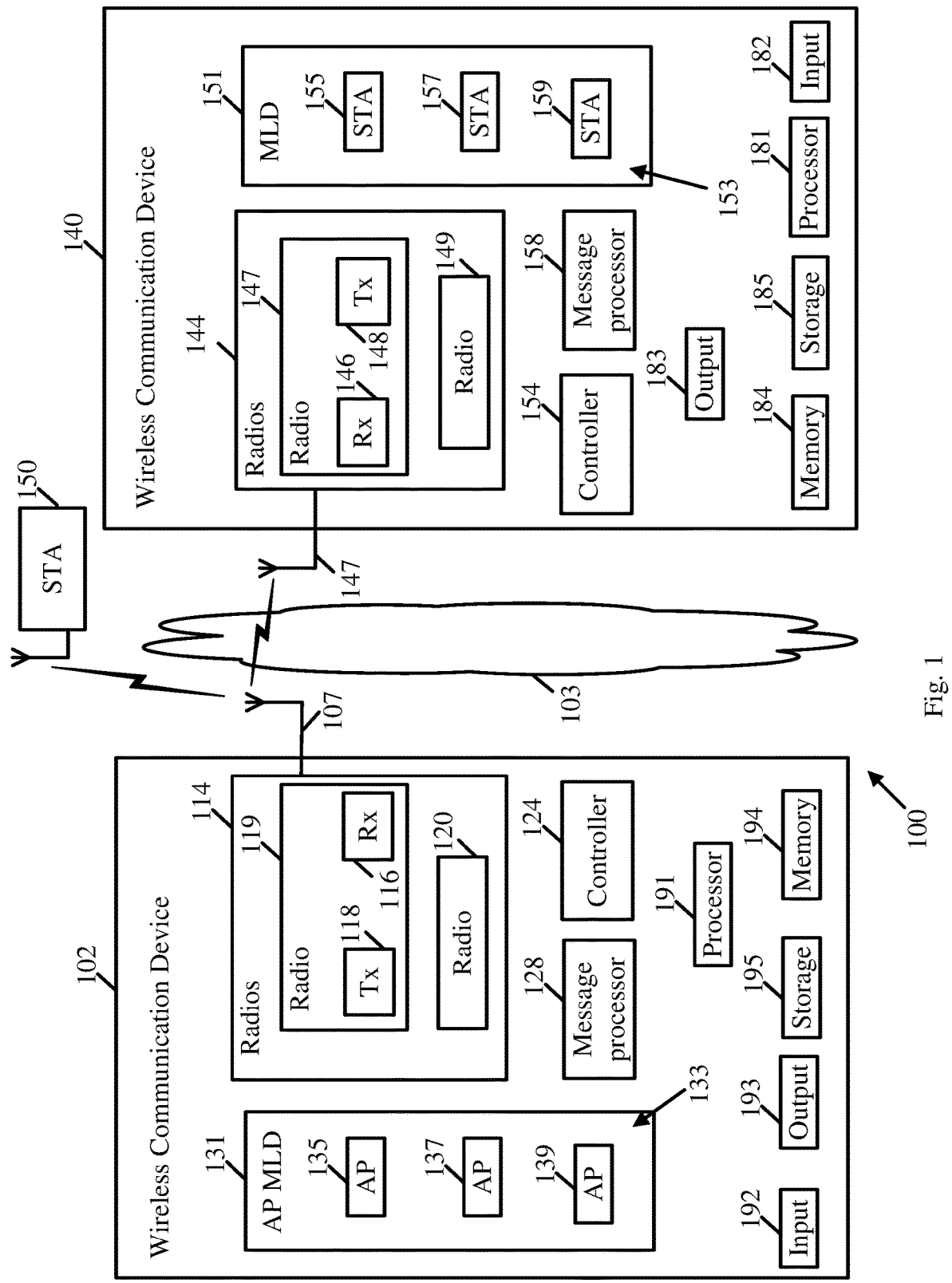
FIG. 1 is a schematic block diagram illustration of a system, in accordance with some demonstrative embodiments.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—*

Telecommunications and Information Exchange between Systems Local and Metropolitan Area Networks—Specific Requirements; Part 11: Wireless LAN Medium Access Control (MAC) and Physical Layer (PHY) Specifications, December, 2020); and/or IEEE 802.11be (IEEE P802.11be/ D1.2 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), September 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 150, and/or one or more other devices.

In some demonstrative aspects, devices 102, 140 and/or 150 may include a mobile device or a non-mobile, e.g., a static, device.

For example, devices 102, 140 and/or 150 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 150 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102, device 140, and/or device 150 may include one or more radios including circuitry and/or logic to perform wireless communication between devices 102, 140, 150 and/or one or more other wireless communication devices. For example, device 102 may include one or more radios 114, and/or device 140 may include one or more radios 144.

In some demonstrative aspects, radio 114 may include at least a first radio 119, and a second radio 120. For example, radio 119 may be configured to communicate over a first wireless communication channel, and/or radio 120 may be configured to communicate over a second wireless communication channel, e.g., as described below.

In some demonstrative aspects, radio 144 may include at least a first radio 147, and a second radio 149. For example, radio 147 may be configured to communicate over the first wireless communication channel, and/or radio 149 may be configured to communicate over the second wireless communication channel, e.g., as described below.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative embodiments, device 102 may include one or more antennas 107, e.g., a single antenna 107 or a plurality of antennas 107, and/or device 140 may include one or more antennas 147, e.g., a single antenna 147 or a plurality of antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 150 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 150 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs.

For example, device 102 may include at least one STA, and/or device 140 may include at least one STA.

In some demonstrative aspects, device 102, device 140, and/or device 150 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102, 140, and/or 150 may include, operate as, perform the role of, and/or perform one or more functionalities of, any other wireless device and/or station, e.g., a WLAN STA, a WiFi STA, and the like.

In some demonstrative aspects, device 102, device 140, and/or device 150 may be configured operate as, perform the role of, and/or perform one or more functionalities of, an access point (AP), e.g., an EHT AP STA.

In some demonstrative aspects, device 102, device 140, and/or device 150 may be configured to operate as, perform the role of, and/or perform one or more functionalities of, a non-AP STA, e.g., an EHT non-AP STA.

In other aspects, device 102, device 140, and/or device 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102, 140, and/or 150 may be configured to communicate in an EHT network, and/or any other network.

In some demonstrative aspects, devices 102, 140, and/or 150 may be configured to operate in accordance with one or more Specifications, for example, including one or more *IEEE 802.11 Specifications*, e.g., an *IEEE 802.11-2020 Specification*, an IEEE 802.11be Specification, and/or any other specification and/or protocol.

In some demonstrative aspects, device 102, device 140, and/or device 150 may include, operate as, perform a role of, and/or perform the functionality of, one or more multi-link logical entities, e.g., as described below.

In other aspect, device 102, device 140, and/or device 150 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102, device 140, and/or device 150 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102, device 140, and/or device 150 may be configured to operate as, perform the role of, and/or perform one or more functionalities of, an AP MLD.

In some demonstrative aspects, device 102, device 140, and/or device 150 may be configured to operate as, perform the role of, and/or perform one or more functionalities of, a non-AP MLD.

In other aspects, device 102, device 140, and/or device 150 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects, controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
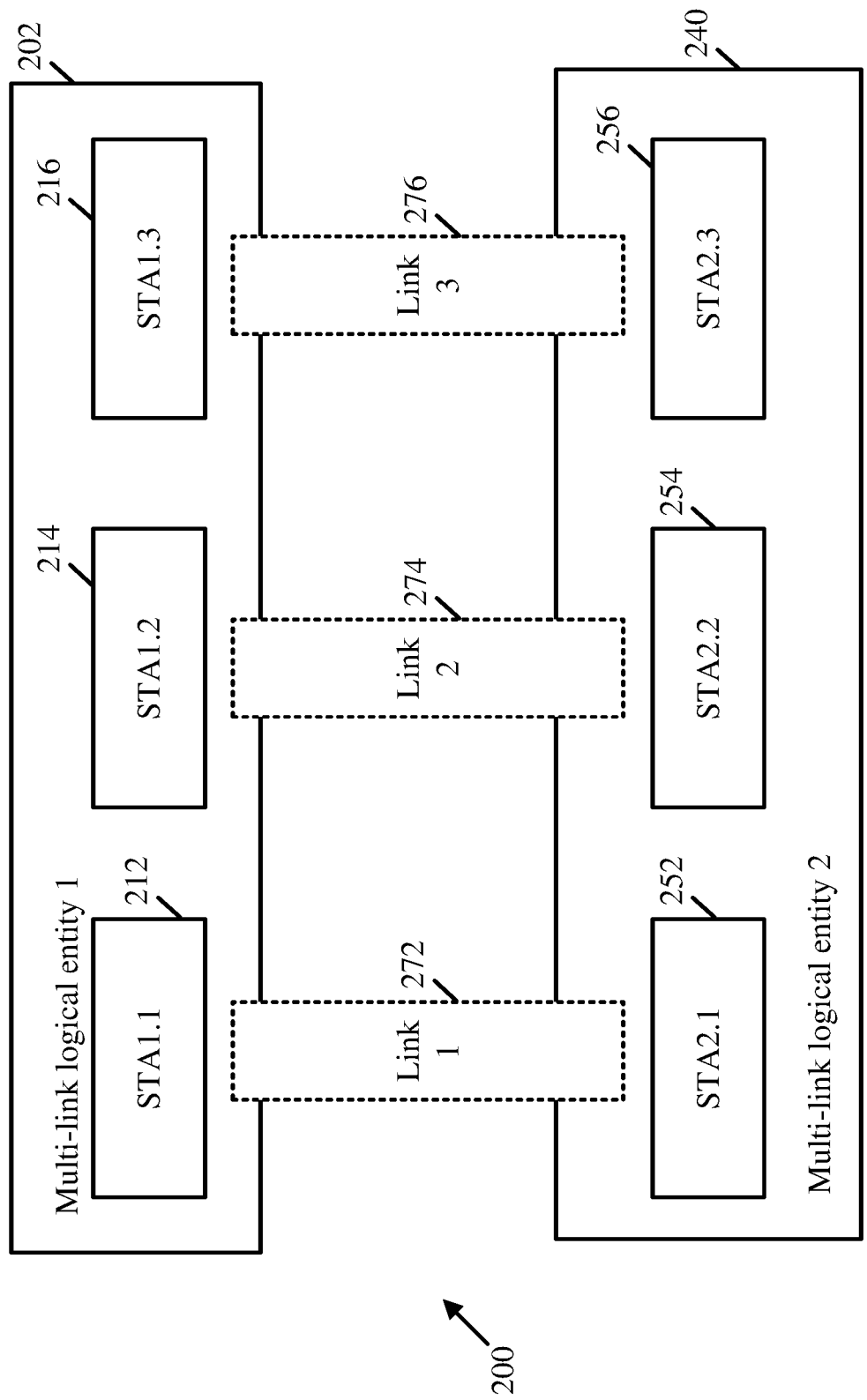
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
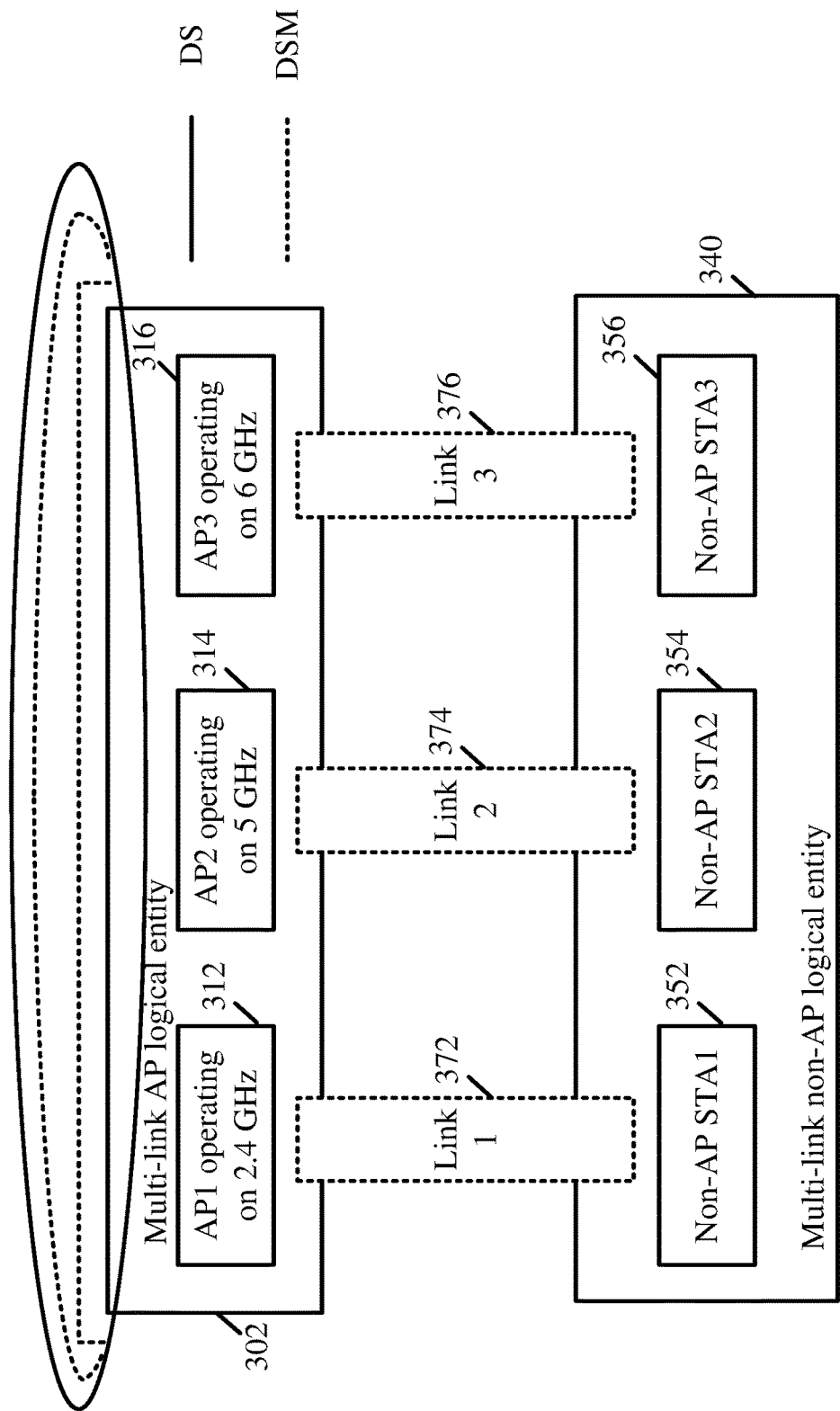
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to, during an ongoing communication between devices 102 and/or 140 over a first wireless communication channel, generate, transmit, receive and/or process one or more transmissions over a second wireless communication channel, e.g., as described below.

Referring back to FIG. 1, in some demonstrative aspects, devices 102 and/or 140 may be configured to implement a suspension mechanism, which may be configured to provide a technical solution to suspend an ongoing wireless communication, e.g., as described below.

In some demonstrative aspects, devices 102 and/or 140 may be configured to implement a suspension mechanism, which may be configured to provide a technical solution to support communication of a suspension request over a wireless communication channel, which may be different from a wireless communication channel utilized by the ongoing wireless communication, e.g., as described below.

In some demonstrative aspects, for example, in some use cases, implementations, scenarios, and/or deployments, there may be a need to provide a technical solution to support communication, e.g., an urgent communication, between a STA and an AP, for example, during an ongoing communication between the AP and another STA.

For example, when a STA uses a wireless medium to communicate with an AP, e.g., a serving AP, or vice-versa, a channel may be busy and may not be allowed to be reused by other STAs in the neighborhood, which may have a busy Clear Channel Assessment (CCA) indicate.

For example, the medium may stay busy for a relatively long time, e.g., 5 milliseconds (msec) or any other time period, for example, depending on a duration of a Transmit opportunity (TxOP) obtained for communication between the AP and the STA, and/or a duration of a PPDU communicated between the AP and the STA.

For example, in some use cases, deployments, and/or scenarios, the medium may remain busy for a relatively long time, for example, when STAs and/or an AP in the same BSS, or STAs and/or an AP in different BSS, e.g., an Overlapping BSS (OBSS), may operate in a same channel.

For example, an AP/BSS may account for one or more times, for example, in order to ensure a worst case latency bound for transmissions from the AP and/or transmissions from STAs in the BSS.

In one example, the AP/BSS may account for a time to access the wireless medium. For example, the time to access the wireless medium may include a time that a STA may need to wait until a channel becomes idle followed by a contention time for contention with other STAs.

In another example, the AP/BSS may need to account for a time to complete a transmission procedure, for example, including a time to transmit a transmission over the wireless medium, a time to receive an acknowledgement to acknowledge the transmission, and/or a potential time to retransmit the transmission, e.g., if needed.

For example, in some use cases, deployments, and/or scenarios, the time to access the medium may be more significant than the time to complete the transmission, for example, when the required worst-case latency is low and the wireless channel is loaded, e.g., in case of many STAs and/or OBSSs in an area.

In one example, the AP may enforce lowering a TxOP duration and/or a maximal (max) PPDU duration, for example, in order to reduce the time to access the medium, e.g., assuming that neighboring APs would operate in a similar manner.

In another example, the AP may try and alternate quickly between UL and DL transmission periods, e.g., in attempt to minimize latency for accessing the wireless medium. For example, alternating quickly between the UL and DL transmission periods may provide more opportunities for STAs to request/transmit urgent packets.

In some demonstrative aspects, for example, in some use cases, implementations, scenarios, and/or deployments, there may be one or more technical limitations and/or issues in an implementation utilizing the mechanisms of lowering the TxOP duration, lowering the max PPDU duration, and/or alternating between the UL and DL transmission periods, e.g., as described below.

In one example, an OBSS may not respect the rules described above with respect to adjusting the duration of the time for accessing the medium.

In another example, adjusting the duration of the time for accessing the medium may have a reduced efficiency, for example, when implemented with small TxOP size. For example, although a TxOP length limitation with a relatively small value may enable small time critical packet transmission with a worst case latency, the TxOP limitation may have a cost, for example, with respect to spectrum efficiency and/or throughput.

In some demonstrative aspects, for example, in some use cases, scenarios, and/or implementations there may be a need to address one or more technical issues, when implementing a preemption mechanism, e.g., as described below.

For example, the preemption mechanism may be configured to allow a STA/AP that has urgent packets to send information to a peer STA/AP to stop an ongoing transmission, for example, in order to give back a channel/medium to the STA that has urgent packets.

In some demonstrative aspects, for example, in some use cases, implementations, scenarios, and/or deployments, there may be a need to address one or more technical issues, for example, to support implementation of the preemption mechanism in one or more scenarios, e.g., as described below.

In one example, there may be a technical need to configure the preemption mechanism to support communication between STA/APs, e.g., even when a main channel is busy.

In another example, there may be a technical need to configure the preemption mechanism to allow stopping an ongoing PPDU transmission, e.g., even in the middle of the transmission, and to give back the medium for the STAs that have urgent packets.

In some demonstrative aspects, for example, in some use cases, implementations, scenarios, and/or deployments, one approach to allow communication between STA/APs when the main channel is busy may include implementing a full duplex communication scheme on both the AP side and the STA side, e.g., if implementation allows. However, such an implementation of the full duplex communication scheme may increase implementation cost and/or complexity.

In some demonstrative aspects, for example, in some use cases, implementations, scenarios, and/or deployments, according to another approach, STA/APs may be configured according to a mechanism that enforces that every long PPDU is paused every predefined period, e.g., x milliseconds (msec) or y microseconds (usec), for a quiet period, for example, during which other STAs can send a signal to request urgent transmission and preempt the channel.

For example, at the end of the quiet period, if the channel didn't get preempted, e.g., no requests by the STA/AP, the ongoing PPDU may be un-paused, e.g., to continue where it left off. For example, if the channel was preempted, the urgent STA may be provided channel access and the ongoing PPDU will be terminated.

This preemption mechanism may be relatively simple. However this preemption mechanism may be inefficient as it may consume time resources over the main channel used by the BSS.

In some demonstrative aspects, devices 102 and 140 may be configured to utilize a communication suspension mechanism, which may be configured to allow suspension of a communication between an AP and a STA over a particular channel, e.g., as described below.

In some demonstrative aspects, the communication suspension mechanism may be configured to support a technical solution to allow an AP, for example, an AP implemented by device 102, e.g., AP 135, to utilize a radio, e.g., its main radio(s), to operate on a first wireless communication channel (also referred to as the "main channel") with one or more STAs, e.g., a STA implemented by device 140.

In some demonstrative aspects, for example, in some use cases, implementations, scenarios, and/or deployments, the communication suspension mechanism may be configured to support a technical solution to allow the AP, e.g., AP 135, to implement an additional radio (also referred to as "Ultra Low Latency (ULL) radio" and/or "dedicated radio") to operate on a second wireless communication channel (also referred as an "ULL channel"), e.g., different from the first wireless communication channel.

In some demonstrative aspects, for example, in some use cases, implementations, scenarios, and/or deployments, the main radio channel and the ULL channel may include two different channels, e.g., as described below.

In some demonstrative aspects, for example, in some use cases, implementations, scenarios, and/or deployments, the main radio channel and the ULL channel may have no overlap, e.g., as described below.

In some demonstrative aspects, for example, in some use cases, implementations, scenarios, and/or deployments, the main radio channel and the ULL channel may be separated in frequency. For example, the main radio channel and the ULL channel may be widely separated from each other, e.g., as described below.

In some demonstrative aspects, for example, in some use cases, implementations, scenarios, and/or deployments, the main radio channel and the ULL channel may be relatively largely separated, for example, in order to reduce interference between the main radio and the ULL radio, for example, when both radios are used simultaneously, and/or to facilitate filtering/isolation between the main radio and the ULL radio, e.g., as described below.

In some demonstrative aspects, for example, in some use cases, implementations, scenarios, and/or deployments, the main radio channel and the ULL channel may have overlap, e.g., may partly overlap in frequency, e.g., as described below.

In some demonstrative aspects, for example, in some use cases, implementations, scenarios, and/or deployments, the communication suspension mechanism may support a technical solution to allow the AP to configure the ULL channel to overlap, e.g., partially overlap, with a channel currently being used by a neighbor AP, e.g., an AP of a same ESS, for example, if the AP is part of an ESS with frequency reuse planning.

In some demonstrative aspects, for example, in some use cases, implementations, scenarios, and/or deployments, the communication suspension mechanism may support a technical solution to avoid or reduce impact on an operating bandwidth of the AP/BSS, for example, at the cost of an extra radio to support the AP in simultaneous operation on the main radio and the ULL radio. For example, in some use cases, implementations, scenarios, and/or deployments, the two radios, e.g., the main radio and the ULL radio, may be implemented only on the AP side, e.g., to reduce a burden on the STA side. For example, in case the STA is implemented using both the main radio and the ULL radio, the STA may operate simultaneously, e.g., sometimes, on both radios. For example, in case the STA is implemented using a single radio, the STA may alternate the radio in time between the ULL channel and the main channel.

In some demonstrative aspects, the communication suspension mechanism may be configured to support a technical solution to enable ultra-low latency capability for Wi-Fi devices. This ultra-low latency capability may be important, or even critical, for wireless applications, for example, wireless time-sensitive network applications, Augmented Reality/Virtual Reality (AR/VR) applications and/or any other applications, and/or may enhance user experience.

In some demonstrative aspects, the communication suspension mechanism may be configured for implementation by an AP MLD, e.g., AP MLD 131. For example, the AP MLD may utilize one or more radios of the AP MLD as main radios, e.g., for communication over one or more main channels. For example, the AP MLD may utilize at least one radio of the AP MLD as an ULL radio, e.g., as described below.

For example, AP MLD 131 may be configured to utilize radio 119 as a main radio, and/or radio 120 as an ULL radio, e.g., as described below.

In some demonstrative aspects, the AP MLD may utilize the ULL radio as an additional main radio, for example, when the AP MLD is not supporting low latency applications.

In some demonstrative aspects, an AP MLD implemented by device 102, e.g., AP MLD 131, may be configured to implement the communication suspension mechanism, for example, to suspend an ongoing communication between the AP MLD and a first non-AP STA over a first wireless communication channel, for example, based on a suspend request communicated between the AP MLD and a second non-AP STA over a second wireless communication channel, e.g., as described below.

In some demonstrative aspects, controller 124 may be configured to operate a first AP of an AP MLD implemented by device 102, e.g., AP 135 of AP MLD 131, to communicate over the first wireless communication channel, e.g., as a main channel, and/or to operate a second AP of the AP MLD implemented by device 102, e.g., AP 137 of AP MLD 131, to communicate over the second wireless communication channel, e.g., as an ULL channel, e.g., as described below.

In some demonstrative aspects, controller 124 may be configured to operate the second AP of the AP MLD implemented by device 102, e.g., AP 137, as an Ultra-Low Latency (ULL) AP, e.g., as described below.

In some demonstrative aspects, controller 124 may be configured to configure the second wireless communication channel as an ULL channel, which may be restricted to ULL communications, e.g., as described below.

In some demonstrative aspects, controller 124 may be configured to cause the AP MLD implemented by device

102, e.g., AP MLD 131, to set the second wireless communication channel, for example, based on the first wireless communication channel and one or more wireless communication channels of one or more neighbor APs, e.g., as described below.

In some demonstrative aspects, controller 124 may be configured to cause the AP MLD implemented by device 102, e.g., AP MLD 131, to set the second wireless communication channel to overlap with a wireless communication channel of a neighbor AP, for example, an AP in a same Extended Service Set (ESS) as the first AP of the AP MLD, for example, AP 135, e.g., as described below.

In some demonstrative aspects, the second wireless communication channel may be configured to have no overlap with the first wireless communication channel, e.g., as described below.

In other aspects, the second wireless communication channel may be configured to have overlap, e.g., to partially overlap, with the first wireless communication channel, e.g., as described below.

In some demonstrative aspects, controller 124 may be configured to cause the AP MLD implemented by device 102, e.g., AP MLD 131, to, during an ongoing communication between the first AP of the AP MLD, e.g., AP 135, and a first non-AP STA, e.g., a STA implemented by device 150, over the first wireless communication channel, communicate a suspend request by the second AP of the AP MLD, e.g., AP MLD 137, over the second wireless communication channel, e.g., as described below.

In some demonstrative aspects, the suspend request may be configured to request suspension of the ongoing communication between the first AP of the AP MLD and the first non-AP STA, e.g., as described below.

In some demonstrative aspects, controller 124 may be configured to cause the AP MLD implemented by device 102, e.g., AP MLD 131, to suspend the ongoing communication between the first AP of the AP MLD, e.g., AP 135, and the first non-AP STA over the first wireless communication channel for a suspension period, e.g., as described below.

In some demonstrative aspects, controller 124 may be configured to cause the AP MLD implemented by device 102, e.g., AP MLD 131, to suspend the ongoing communication between the first AP of the AP MLD, e.g., AP 135, for example, based on the suspend request, e.g., as described below.

In some demonstrative aspects, controller 124 may be configured to cause the AP MLD implemented by device 102, e.g., AP MLD 131, to communicate a frame by the first AP of the AP MLD, e.g., AP 135, over the first wireless communication channel during the suspension period, e.g., as described below.

In some demonstrative aspects, controller 124 may be configured to cause the AP MLD implemented by device 102, e.g., AP MLD 131, to communicate the frame between the first AP of the AP MLD, e.g., AP 135m and a second non-AP STA, e.g., as described below.

In some demonstrative aspects, the first non-AP STA may include a STA implemented by a first wireless communication device, e.g., STA 150, and the second non-AP STA may include a STA implemented by a second wireless communication device, e.g., device 140, e.g., as described below.

In some demonstrative aspects, the suspend request may include a received suspend request, which is received by the second AP of the AP MLD, e.g., AP 137, as described below.

In some demonstrative aspects, controller 124 may be configured to cause the second AP of the AP MLD, e.g., AP 137, to receive the received suspend request from the second non-AP STA, for example, from a non-AP STA implemented by device 140, e.g., as described below.

In some demonstrative aspects, the received suspend request may be configured to indicate a request from the second non-AP STA, e.g., the non-AP STA implemented by device 140, to transmit an uplink (UL) transmission to AP MLD 131, e.g., as described below.

In some demonstrative aspects, the received suspend request may include an urgent UL request configured to indicate a request from the second non-AP STA, e.g., the non-AP STA implemented by device 140, to transmit an urgent UL transmission to the AP MLD, e.g., AP MLD 131, e.g., as described below.

In some demonstrative aspects, controller 124 may be configured to cause the AP MLD implemented by device 102, e.g., AP MLD 131, to transmit a Trigger Frame (TF) from the first AP of the AP MLD, e.g., AP 135, to the second non-AP STA, e.g., the non-AP STA implemented by device 140, over the first wireless communication channel, for example, during the suspension period, e.g., as described below.

For example, AP 135 may be configured to transmit the TF to device 140 over the first wireless communication channel during the suspension period.

In some demonstrative aspects, the TF may be configured to trigger the UL transmission from the second non-AP STA, e.g., the non-AP STA implemented by device 140, for example, during the suspension period, e.g., as described below.

In some demonstrative aspects, the ongoing communication between the first AP of the AP MLD 131, e.g., AP 135, and the first non-AP STA, e.g., STA 150, may include a downlink (DL) transmission from the first AP of the AP MLD, e.g., AP 135, to the first non-AP STA, e.g., STA 150, over the first wireless communication channel, e.g., as described below.

In some demonstrative aspects, controller 124 may be configured to cause the AP MLD implemented by device 102, e.g., AP MLD 131, to resume the DL transmission from the first AP of the AP MLD, e.g., AP 135, to the first non-AP STA, e.g., STA 150, for example, after the suspension period, e.g., as described below.

In some demonstrative aspects, controller 124 may be configured to cause the AP MLD implemented by device 102, e.g., AP MLD 131, to operate the second AP of the AP MLD, e.g., AP 137, to monitor the second wireless communication channel for detection of the suspend request, for example, during the ongoing communication between the first AP of the AP MLD, e.g., AP 135, and the first non-AP STA, e.g., STA 150, over the first wireless communication channel, e.g., as described below.

In some demonstrative aspects, the first non-AP STA and the second non-AP STA may include STAs implemented by a same device, for example, STAs of a non-AP MLD, e.g., as described below.

In one example, the first non-AP STA and the second non-AP STA may be part of the non-AP MLD implemented by device 140, for example, non-AP MLD 151, e.g., as described below.

In some demonstrative aspects, the suspend request may include a transmitted suspend request to indicate a request from the AP MLD, e.g., AP MLD 131, to a non-AP MLD, e.g., non-AP MLD 151, to suspend an UL transmission from a first STA of the non-AP MLD, e.g., STA 155, to the first AP of the AP MLD, e.g., AP 135, as described below.

In some demonstrative aspects, controller 124 may be configured to cause the AP MLD implemented by device 102, e.g., AP MLD 131, to transmit transmitted suspend request by the second AP of the AP MLD, e.g., AP 137, to a second STA of the non-AP MLD, e.g., STA 157, e.g., as described below.

In some demonstrative aspects, controller 124 may be configured to cause the AP MLD implemented by device 102, e.g., AP MLD 131, to transmit a DL transmission including the frame from the first AP of the AP MLD, e.g., AP 135, to the second non-AP STA, e.g., STA 157, over the first wireless communication channel, for example, during the suspension period, e.g., as described below.

In some demonstrative aspects, the second non-AP STA may include a STA of the non-AP MLD, e.g., STA 157 of non-AP MLD 151.

In other aspects, the second non-AP STA may include a STA, which is not part of the non-AP MLD. In one example, the second non-AP STA may include a STA implemented by STA 150, and/or by any other additional or alternative STA.

In some demonstrative aspects, controller 124 may be configured to cause the AP MLD implemented by device 102, e.g., AP MLD 131, to resume reception of the UL transmission from the first STA of the non-AP MLD, e.g., STA 155, for example, after the suspension period, e.g., as described below.

In some demonstrative aspects, controller 124 may be configured to cause the AP MLD implemented by device 102, e.g., AP MLD 131, to transmit a trigger frame from the first AP of the AP MLD, e.g., AP 135, to the second non-AP STA, for example, after the UL transmission from the first STA of the non-AP MLD, e.g., the STA 155, as described below.

In some demonstrative aspects, the trigger frame may be configured to trigger an acknowledgment (ACK) from the second non-AP STA, e.g., as described below.

In some demonstrative aspects, the ACK may be configured to acknowledge the DL transmission from the first AP of the AP MLD, e.g., AP 135, to the second non-AP STA, e.g., as described below.

In some demonstrative aspects, controller 124 may be configured to cause the AP MLD implemented by device 102, e.g., AP MLD 131, to transmit a delayed ACK from the first AP of the AP MLD, e.g., AP 135, to the first STA of the non-AP MLD, e.g., STA 155, for example, after the ACK from the second non-AP STA, e.g., as described below.

In some demonstrative aspects, the delayed ACK from the first AP of the AP MLD, e.g., AP 135, may be configured to acknowledge the UL transmission from the first STA of the non-AP MLD, e.g., STA 155, as described below.

In some demonstrative aspects, controller 124 may be configured to cause the AP MLD implemented by device 102, e.g., AP MLD 131, to transmit the transmitted suspend request from the second AP of the AP MLD, e.g., AP 137, for example, according to a non-contention mechanism, e.g., as described below.

In some demonstrative aspects, the non-contention mechanism may be configured to allow transmission over the second wireless communication channel with no contention, e.g., as described below.

In some demonstrative aspects, controller 124 may be configured to cause the AP MLD implemented by device 102, e.g., AP MLD 131, to prohibit transmission of one or more types of frames from the second AP of the AP MLD, e.g., AP 137, over the second wireless communication channel, e.g., as described below.

In some demonstrative aspects, controller 124 may be configured to cause the AP MLD implemented by device 102, e.g., AP MLD 131, to prohibit transmission of beacon frames and probe response frames from the second AP of the AP MLD, e.g., AP 137, over the second wireless communication channel, e.g., as described below.

In some demonstrative aspects, controller 124 may be configured to cause the AP MLD implemented by device 102, e.g., AP MLD 131, to include description information in one or more frames transmitted by the first AP of the AP MLD, e.g., AP 135, over the first wireless communication channel, e.g., as described below.

In some demonstrative aspects, the one or more frames may include at least one of a beacon frame or a probe response frame, e.g., as described below. In other aspects, the one or more frames may include any other additional or alternative type of frame.

In some demonstrative aspects, the description information may be configured to include at least one of information corresponding to the second AP of the AP MLD, e.g., AP 137, and/or information corresponding to the second wireless communication channel, for example, information corresponding to the ULL channel, e.g., as described below.

In some demonstrative aspects, the description information may be configured to include an indication of one or more rules for communication with the second AP of the AP MLD, e.g., AP 137, over the second wireless communication channel, e.g., as described below.

In some demonstrative aspects, the description information may be configured to include an indication of one or more types of frames allowed for transmission to the second AP of the AP MLD, e.g., AP 137, over the second wireless communication channel, e.g., as described below.

In other aspects, the description information may be configured to include any other additional or alternative information.

In some demonstrative aspects, controller 154 may be configured to cause a non-AP STA implemented by device 140, e.g., a non-AP STA of non-AP MLD 151 or any other STA, to process the description information in one or more frames received from a first AP of an AP MLD, e.g., the one or more frames from AP 135 of AP MLD 131, over a first wireless communication channel, e.g., as described below.

In some demonstrative aspects, the one or more frames from the first AP may include at least one of a beacon frame or a probe response frame, e.g., as described below. In other aspects, the one or more frames from the first AP may include any other additional or alternative type of frame.

In some demonstrative aspects, the description information may be configured to include information corresponding to a second wireless communication channel of a second AP of the AP MLD, for example, the AP 137 of AP MLD 131, e.g., as described below.

In some demonstrative aspects, the second wireless communication channel may have no overlap with the first wireless communication channel, e.g., as described below.

In other aspects, the second wireless communication channel may have overlap, e.g., partial overlap, with the first wireless communication channel, e.g., as described below.

In some demonstrative aspects, the second wireless communication channel may include an ULL channel restricted to ULL communications, e.g., as described below.

In some demonstrative aspects, controller 154 may be configured to cause the non-AP STA implemented by device 140 to transmit a suspend request from the non-AP STA implemented by device 140 to the second AP of the AP MLD, e.g., AP 137, over the second wireless communication channel, for example, based on a determination that the first wireless communication channel is busy and an UL transmission is pending from the non-AP STA implemented by device 140 to the AP MLD, e.g., AP MLD 131, e.g., as described below.

In some demonstrative aspects, the suspend request may be configured to request suspension of an ongoing communication of the first AP of the AP MLD, e.g., AP 135, over the first wireless communication channel, e.g., as described below.

In some demonstrative aspects, the suspend request may include an urgent UL request configured to indicate a request from the non-AP STA implemented by device 140 to transmit an urgent UL transmission to the AP MLD, e.g., AP MLD 131, e.g., as described below.

In some demonstrative aspects, controller 154 may be configured to cause the non-AP STA implemented by device 140 to process a TF received from the first AP of the AP MLD, e.g., AP 135, over the first wireless communication channel, for example, after the suspend request, e.g., as described below.

In some demonstrative aspects, controller 154 may be configured to cause the non-AP STA implemented by device 140 to transmit the UL transmission to the first AP of the AP MLD, e.g., AP 135, for example, based on the TF, e.g., as described below.

In some demonstrative aspects, controller 154 may be configured to restrict to the non-AP STA implemented by device 140 to transmit to the second AP of the AP MLD, e.g., AP 137, over the second wireless communication channel, for example, only according to one or more rules for communication with the second AP of the AP MLD, e.g., AP 137, over the second wireless communication channel, e.g., as described below.

In some demonstrative aspects, the one or more rules may be indicated by the description information received from the first AP, e.g., as described below.

In some demonstrative aspects, controller 154 may be configured to cause the non-AP STA implemented by device 140 to transmit the suspend request to the second AP of the AP MLD, e.g., AP 137, for example, according to a non-contention mechanism, e.g., as described below.

In some demonstrative aspects, the non-contention mechanism may be configured to allow transmission over the second wireless communication channel with no contention, e.g., as described below.

In some demonstrative aspects, controller 154 may be configured to cause the non-AP STA implemented by device 140 to transmit the suspend request to the second AP of the AP MLD, e.g., AP 137, for example, according to a contention mechanism, e.g., as described below.

In some demonstrative aspects, the contention mechanism for may be configured to provide access to the second wireless communication channel with a delay of no more than 10 microseconds.

In other aspects, the contention mechanism may be configured to provide access to the second wireless communication channel with any other delay.

In some demonstrative aspects, controller 154 may be configured to cause the non-AP MLD implemented by device 140, e.g., non-AP MLD 151, to utilize a suspend request for suspension of an ongoing DL from an AP MLD, for example, the AP MLD 131 implemented by device 102, e.g., as described below.

In some demonstrative aspects, controller 154 may be configured to cause the non-AP MLD implemented by device 140, e.g., non-AP MLD 151, to process an ongoing UL transmission from a first STA of the non-AP MLD, e.g., STA 155, to a first AP of an AP MLD, e.g., AP 135 of AP MLD 131, over a first wireless communication channel.

In some demonstrative aspects, controller 154 may be configured to cause the non-AP MLD implemented by device 140, e.g., non-AP MLD 151, to receive by a second STA of the non-AP MLD, e.g., STA 157, a suspend request from a second AP of the AP MLD, e.g., AP 137 of AP MLD 131, over a second wireless communication channel, for example, during the ongoing UL transmission, e.g., as described below.

In some demonstrative aspects, the suspend request may be configured to request suspension of the ongoing UL transmission from the first STA of the non-AP MLD, e.g., STA 155, to the first AP of the AP MLD, for example, the AP 135 of AP MLD 131, e.g., as described below.

For example, STA 157 may be configured to receive the suspend request from AP 137 over the second wireless communication channel, for example, during the ongoing UL transmission from STA 155 to AP 135 over the first wireless communication channel.

In some demonstrative aspects, the second wireless communication channel may have no overlap with the first wireless communication channel, e.g., as described below.

In other aspects, the second wireless communication channel may have overlap, e.g., partial overlap, with the first wireless communication channel, e.g., as described below.

In some demonstrative aspects, the second wireless communication channel may include an ULL channel restricted to ULL communications, e.g., as described below.

In some demonstrative aspects, controller 154 may be configured to cause the non-AP MLD implemented by device 140, e.g., non-AP MLD 151, to suspend the ongoing UL transmission over the first wireless communication channel for a suspension period, for example, based on the suspension request, e.g., as described below.

In some demonstrative aspects, controller 154 may be configured to cause the non-AP MLD implemented by device 140, e.g., non-AP MLD 151, to resume the ongoing UL transmission from the first STA of the non-AP MLD, e.g., STA 155, to the first AP of the AP MLD, e.g., AP 135, over the first wireless communication channel, for example, after the suspension period, e.g., as described below.

In some demonstrative aspects, controller 154 may be configured to control a first radio of device 140, e.g., radio 147, to communicate, e.g., as a main radio, over the first wireless communication channel, and to control a second radio of device 140, e.g., radio 149, to communicate, e.g., as an ULL radio, over the second wireless communication channel, e.g., as described below.

In some demonstrative aspects, controller 154 may be configured to cause the non-AP MLD implemented by device 140, e.g., non-AP MLD 151, to process a DL transmission from the AP MLD, e.g., AP MLD 131, for example, during the suspension period, e.g., as described below.

In some demonstrative aspects, the DL transmission may be configured to include a DL transmission from the first AP of the AP MLD, e.g., AP 135, to the first STA of the non-AP MLD, e.g., STA 155, over the first wireless communication channel, e.g., as described below.

In some demonstrative aspects, controller 154 may be configured to cause the non-AP MLD implemented by device 140, e.g., non-AP MLD 151, to process a delayed ACK from the first AP of the AP MLD, e.g., AP 135, over the first wireless communication channel, e.g., as described below.

In some demonstrative aspects, the delayed ACK from the first AP of the AP MLD may be configured to acknowledge the UL transmission from the first STA of the non-AP MLD, e.g., STA 155, e.g., as described below.

In some demonstrative aspects, controller 154 may be configured to cause the non-AP MLD implemented by device 140, e.g., non-AP MLD 151, to operate the second STA of the non-AP MLD, e.g., STA 157, to monitor the second wireless communication channel, e.g., using the radio 149, for detection of the suspend request during the ongoing UL transmission over the first wireless communication channel, e.g., as described below.

In some demonstrative aspects, controller 154 may be configured to cause the non-AP MLD implemented by device 140, e.g., non-AP MLD 151, to prohibit transmission of one or more types of frames from the second STA of the non-AP MLD, e.g., STA 157, over the second wireless communication channel, e.g., as described below.

In some demonstrative aspects, controller 154 may be configured to cause the non-AP MLD implemented by device 140, e.g., non-AP MLD 151, to prohibit transmission of probe request frames from the second STA of the non-AP MLD, e.g., STA 157, over the second wireless communication channel, e.g., as described below.

In some demonstrative aspects, controller 154 may be configured to cause the non-AP MLD implemented by device 140, e.g., non-AP MLD 151, to prohibit transmission of pre-association frames from the second STA of the non-AP MLD, e.g., STA 157, to the second AP of the AP MLD, e.g., AP 137, over the second wireless communication channel, e.g., as described below.

In some demonstrative aspects, for example, in some use cases, implementations, scenarios, and/or deployments, devices 102, 140 and/or 150 may be configured to implement one or more operations and/or functionalities of a communication suspension mechanism, which may be configured for implementation with an MLD framework, e.g., as described below.

For example, an AP MLD, e.g., the AP MLD 131 implemented by device 102, may be configured to include one or more main APs, e.g., APs to communicate over one or more main wireless communication channels/links, and to include one or more ULL APs, e.g., APs to communicate over one or more ULL wireless communication channels/links.

In some demonstrative aspects, for example, in some use cases, implementations, scenarios, and/or deployments, the ULL AP may only be discovered through the main APs, for example, using the main radio channel(s).

In some demonstrative aspects, for example, in some use cases, implementations, scenarios, and/or deployments, the main APs of the AP MLD may be configured to include in one or more frames a Reduced Neighbor Report (RNR) element, and/or any other element, with description information of the ULL AP, for example, in transmitted beacon and/or probe response frames.

In some demonstrative aspects, for example, in some use cases, implementations, scenarios, and/or deployments, the description information of the ULL AP may be configured to include information regarding the ULL AP, e.g., an operating channel of the ULL AP, an operating class of the ULL AP, and/or an operating BW of the ULL AP, and an indication that this AP is an ULL AP.

In some demonstrative aspects, the description information may include one or more rules on how to operate on the channel of the ULL AP, e.g., the ULL channel.

In some demonstrative aspects, for example, in some use cases, implementations, scenarios, and/or deployments, the main APs of the AP MLD may be configured to include additional or alternative information corresponding to the ULL AP in the one or more frames, e.g., the beacon and/or probe response frames, for example, in a multi-link element in a per-STA profile referring to the ULL AP.

In some demonstrative aspects, for example, in some use cases, implementations, scenarios, and/or deployments, a non-AP MLD may be disallowed from sending to the ULL AP one or more types of frames, for example, probe request frames and/or any pre-association frames. For example, the non-AP MLD may be configured to use Multi-Link (ML) probing with one or more of the main APs, for example, to get partial or complete information regarding the ULL AP. For example, the non-AP MLD may use the ML probing, for example, if some or all of the information regarding the ULL APP is not already provided in beacon/probe response frames transmitted by the main APs.

In some demonstrative aspects, for example, in some use cases, implementations, scenarios, and/or deployments, the non-AP MLD may be configured to indicate a capability of operation with the ULL AP, for example, if the non-AP MLD supports operation with the ULL AP.

In some demonstrative aspects, for example, in some use cases, implementations, scenarios, and/or deployments, the non-AP MLD may be configured to perform a ML setup with the AP MLD. For example, the non-AP MLD may be configured to include the ULL link in an ML association procedure, for example, when the non-AP MLD discovers the ULL AP and the main APs.

In some demonstrative aspects, for example, in some use cases, implementations, scenarios, and/or deployments, the non-AP MLD may be configured to employ the ULL link to interact with the AP MLD through the ULL link, for example, after the non-AP MLD associates with the AP MLD with the ULL link.

In some demonstrative aspects, for example, in some use cases, implementations, scenarios, and/or deployments, the non-AP MLD may be prohibited to operate in the ULL channel as over a normal link. For example, the non-AP MLD may be restricted to send and/or receive only certain type of frames, e.g., PPDUs over the ULL channel.

In some demonstrative aspects, for example, in some use cases, implementations, scenarios, and/or deployments, the ULL AP may be configured to operate different from a regular AP. For example, the ULL AP may be configured to operate with one or more limitations. For example, the ULL AP may be restricted to sending and/or receiving only a subset of frames and/or requests over the ULL channel. For example, the ULL AP may be prohibited from sending beacon frames over the ULL channel.

For example, the ULL AP may have specific PHY and/or MAC capabilities, which may enable the ULL AP to support a reduced, e.g., minimum, number of PHY modes. In one example, the ULL AP may be configured to support only a non High-Throughput (non-HT) duplicate (dup) mode, for example, with a Modulation Coding Scheme index 0 (MCS0).

In other aspects, the ULL AP may be configured to support any other additional or alternative functionality.

In some demonstrative aspects, for example, in some use cases, implementations, scenarios, and/or deployments, devices 102, 140 and/or 150 may be configured to implement one or more operations and/or functionalities of a communication suspension mechanism, which may be configured to define one or more rules for the co-operation of the non-AP MLD with the ULL AP, for example, after the non-AP MLD is associated with the AP MLD of the ULL AP.

For example, the non-AP MLD may be restricted to use, e.g., to only use, a modulation supported by the ULL AP. In one example, a new modulation, e.g., that is currently into defined, may be used for communication with the ULL AP.

In some demonstrative aspects, for example, in some use cases, implementations, scenarios, and/or deployments, a STA and/or an AP may be restricted to use, e.g., to only use, the ULL link to send specific requests, for example, a request to send an urgent low latency UL frame, a request for preemption, very limited and short data frames, e.g., if allowed, and/or any other type of frame.

In some demonstrative aspects, for example, in some use cases, implementations, scenarios, and/or deployments, the ULL AP may be configured to receive a request for urgent UL packet from a STA, for example, over the ULL link. For example, the STA may include an ULL STA configured to communicate over the ULL link.

In some demonstrative aspects, for example, in some use cases, implementations, scenarios, and/or deployments, the ULL AP may be configured to force the AP of the AP MLD that is operating on a main link, e.g., a link on which the STA is awake and/or a link indicated in the request as the one on which the STA will be awake, to stop transmitting a DL transmission and to trigger the STA to send an urgent frame in an UL transmission.

In some demonstrative aspects, for example, in some use cases, implementations, scenarios, and/or deployments, the STA may have an urgent data packet to be sent, for example, while some or all of the main operation channels are occupied by a DL transmission, e.g., with a long TxOP length, e.g., as described below with reference to FIG. 4.

In some demonstrative aspects, for example, in some use cases, implementations, scenarios, and/or deployments, the STA may be configured to switch an operation channel of the STA to an ULL operation channel of the AP. For example, the STA may send a suspend request frame to the AP over the ULL channel, e.g., as described below with reference to FIG. 4.

In some demonstrative aspects, for example, in some use cases, implementations, scenarios, and/or deployments, the AP may be configured to suspend a current transmission of the AP over the main radio, for example, upon receipt of the suspend request frame from the STA over the ULL channel. For example, the AP may trigger the STA to send an UL urgent data packet, e.g., as described below with reference to FIG. 4.

In some demonstrative aspects, for example, in some use cases, implementations, scenarios, and/or deployments, the ULL AP may be restricted to use the ULL link, for example, to send a message to a STA of a non-AP MLD, for example, when another STA of the non-AP MLD is transmitting an UL transmission to the AP of the AP MLD on another link, e.g., on the main link, for example, as described below with reference to FIG. 5.

In some demonstrative aspects, for example, in some use cases, implementations, scenarios, and/or deployments, the message sent from the ULL AP to the ULL STA may be configured to include a preemption request, e.g., a suspend request.

In some demonstrative aspects, the preemption request may include a request to suspend the ongoing UL communication between the STA of the non-AP MLD and the AP of the AP MLD over the first wireless communication channel, e.g., the main link.

In some demonstrative aspects, the preemption request may be configured to indicate that the STA of the non-AP MLD that is transmitting on the other link stops transmission, for example, because the AP of the AP MLD has an urgent frame, e.g., an urgent DL transmission, to send, for example, to the STA of the non-AP MLD, and/or to another STA, e.g., as described below.

In some demonstrative aspects, for example, in some use cases, implementations, scenarios, and/or deployments, the STA of the non-AP MLD may be configured to suspend the ongoing UL transmission, e.g., of an ongoing UL PPDU, on one of the main radios, e.g., over the main link, for example, upon reception of the preemption request. For example, the STA may listen to the medium to wait for the frame from the AP of the AP MLD.

In other aspects, the STA of the non-AP MLD may be configured to trigger the AP to get the urgent frame.

In some demonstrative aspects, for example, in some use cases, implementations, scenarios, and/or deployments, STA and/or the AP may be restricted to use the ULL link, for example, only when channel access on one or more, e.g., some or all, main links is currently not possible. For example, the channel access on the main links may be determined to be impossible due to a CCA busy state, and/or when the STA is in Power Save (PS) mode.

In some demonstrative aspects, for example, in some use cases, implementations, scenarios, and/or deployments, the communication suspension mechanism may be configured to define communication over an ULL channel as a mode of operation, which may provide a technical solution to allow avoiding access to a channel, e.g., listen before talk, for example, for communication over the ULL channel. For example, the STA may be configured to transmit over the ULL channel, for example, without substantially any deferring or backoff, or with reduced or minimal delay, for example, with a very short packet design, e.g., less than 10 usec.

In some demonstrative aspects, the communication suspension mechanism may be configured to utilize a very aggressive and/or fast channel access, for example, based on a simple energy detection check on a very short observation, e.g., 4 usec, or any other shot period.

In some demonstrative aspects, for example, in some use cases, implementations, scenarios, and/or deployments, the communication suspension mechanism may be configured to define one or more rules to limit a number of requests, which may be communicated by a STA over the ULL channel. For example, the communication suspension mechanism may be configured to limit a number of transmissions per minute per device, and/or any apply other limitation or restriction.

In some demonstrative aspects, for example, in some use cases, implementations, scenarios, and/or deployments, the one or more rules for communication over the ULL channel may be advertised in one or more of, e.g., or all of, the main links, e.g., unless mandatory in standard under the ULL mode.

Figure 4:
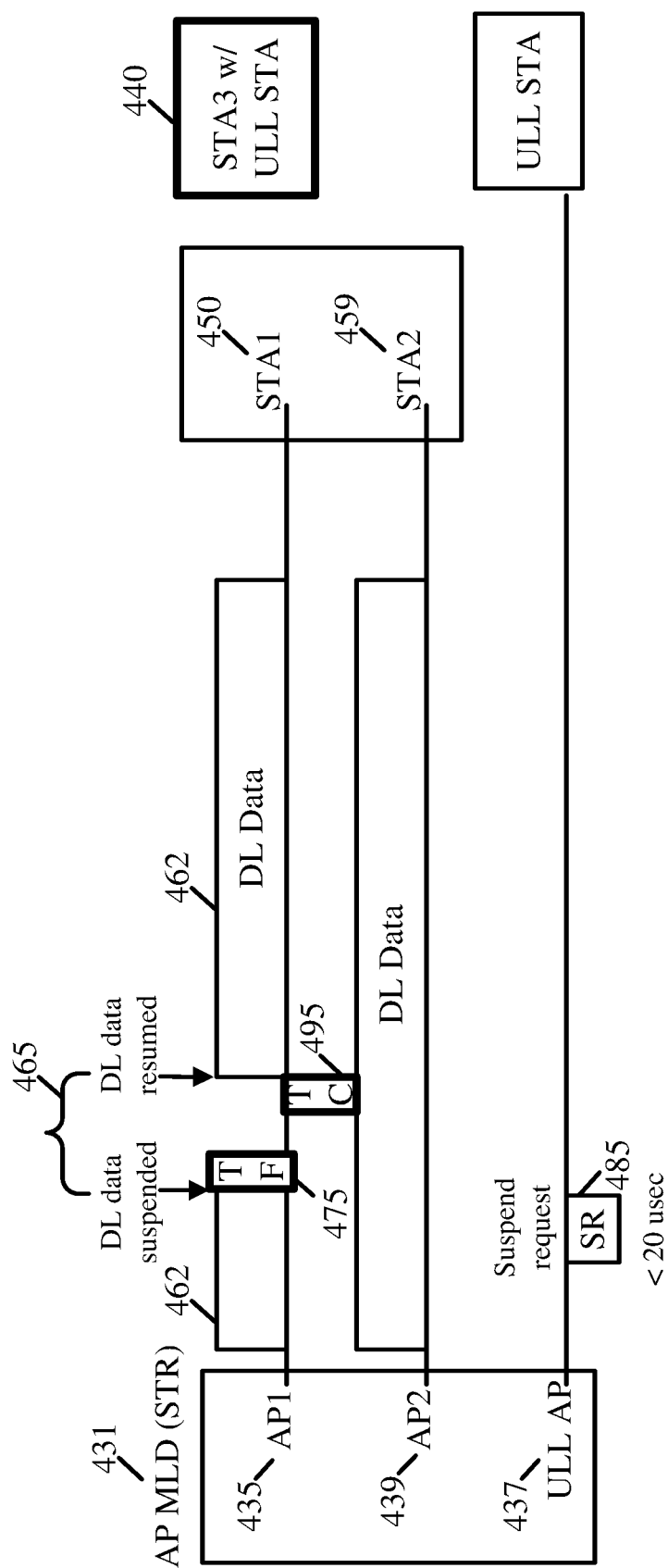
FIG. 4 is a schematic illustration of a communication scheme utilizing a suspension mechanism, in accordance with some demonstrative embodiments.

Reference is made to FIG. 4, which schematically illustrates a communication scheme utilizing a suspension mechanism, in accordance with some demonstrative embodiments. For example, device 102 (FIG. 1) and/or device 140 (FIG. 1) may be configured to perform one or more communications and/or operations according to the communication scheme of FIG. 4.

As shown in FIG. 4, an AP MLD 431 may include one or more APs, e.g., including an AP 435, an AP 437, and/or an AP 439. In one example, AP MLD 131 (FIG. 1) may perform one or more operations of, one or more functionalities of, the role of, and/or the functionality of, AP MLD 431.

As shown in FIG. 4, AP MLD 431 may be configured to communicate with one or more STAs, e.g., a STA 450, a STA 459, and/or a STA 440 over one or more wireless communication channels. In one example, device 140 (FIG. 1) may perform one or more operations of, one or more functionalities of, the role of, and/or the functionality of, STA 440. In one example, device 150 (FIG. 1) may perform one or more operations of, one or more functionalities of, the role of, and/or the functionality of, STA 450 and/or STA 459.

In some demonstrative aspects, AP MLD 431 may be configured to communicate over a first wireless communication channel ("main channel"), and/or over a second wireless communication channel ("ULL channel").

In other aspects, AP MLD 431 may communicate over any other additional or alternative channel, different from the main channel and/or the ULL channel.

In some demonstrative aspects, AP MLD 431 may be configured to communicate a suspend request (SR) 485 by AP 437 over the second wireless communication channel, for example, during an ongoing communication between AP 435 and STA 450 over the first wireless communication channel, e.g., as described below.

In some demonstrative aspects, suspend request 485 may be configured to request suspension of the ongoing communication between AP 435 and STA 450.

In some demonstrative aspects, as shown in FIG. 4, the ongoing communication between AP 435 and STA 450 may include a DL transmission 462 from AP 435 to STA 450 over the first wireless communication channel.

In some demonstrative aspects, as shown in FIG. 4, AP 437 may be configured to receive suspend request 485 from STA 440.

In some demonstrative aspects, suspend request 485 may be configured to indicate a request from STA 440 to transmit an UL transmission, e.g., an urgent UL transmission, to AP MLD 431.

In some demonstrative aspects, AP MLD 431 may be configured to suspend the ongoing communication between AP 435 and STA 450 over the first wireless communication channel, for example, for a suspension period 465, e.g., as described below.

In some demonstrative aspects, AP MLD 431 may be configured to transmit a Trigger Frame (TF) 475 from AP 435 to STA 440 over the first wireless communication channel, for example, during suspension period 465.

In some demonstrative aspects, TF 475 may be configured to trigger the UL transmission from STA 440 during suspension period 465, e.g., as described below.

In some demonstrative aspects, AP MLD 431 may be configured to communicate a frame, e.g., a time critical (TC) data packet communication channel, for example, based on the TF 475, e.g., during suspension period 465.

In some demonstrative aspects, TC data packet 495 may include the UL transmission, e.g., the urgent UL transmission, from STA 440. In other aspects, TC data packet 495 may include any other additional or alternative type of transmission.

In some demonstrative aspects, AP MLD 431 may be configured to resume DL transmission 462 from AP 435 to STA 450, for example, after the suspension period 465.

Figure 5:
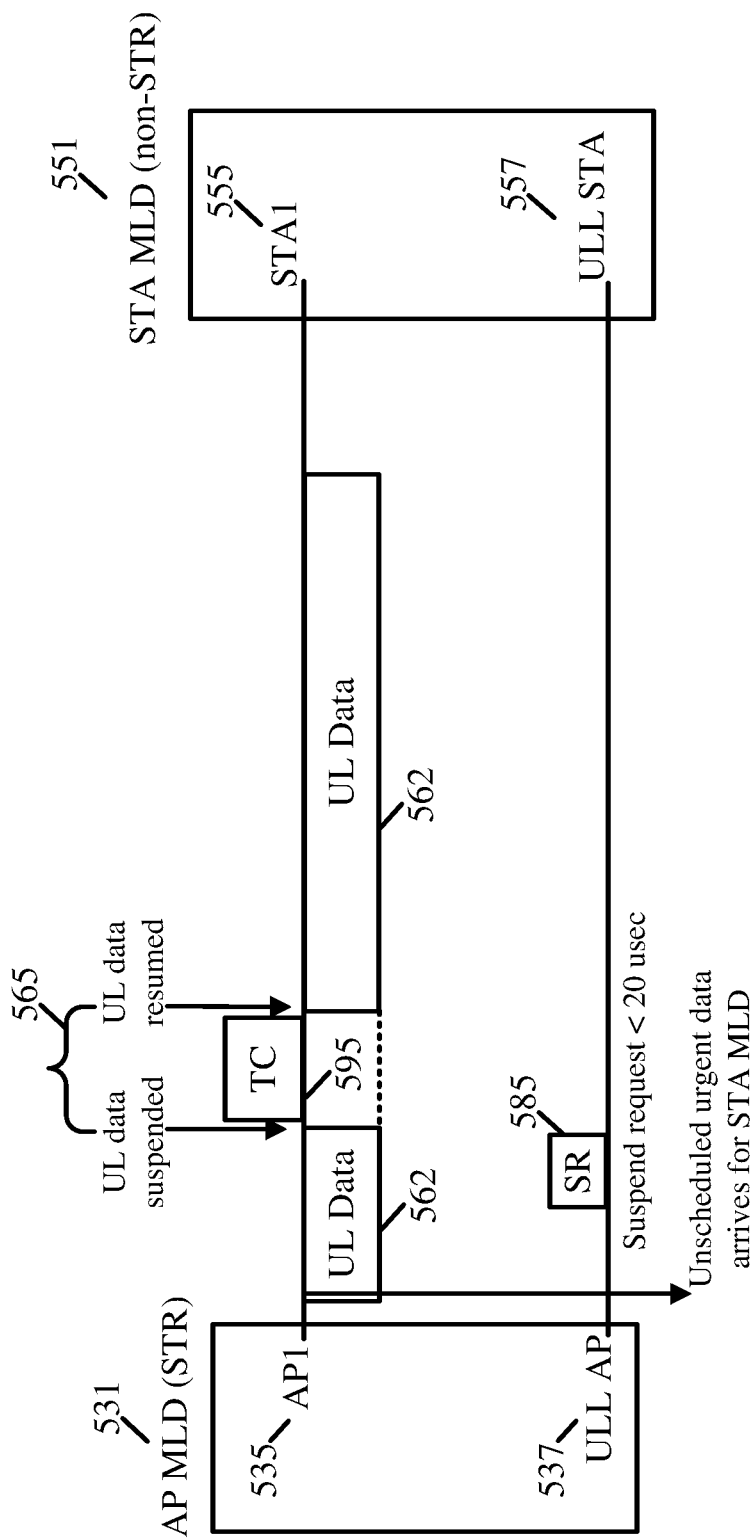
FIG. 5 is a schematic illustration of a communication scheme utilizing a suspension mechanism, in accordance with some demonstrative embodiments.

Reference is made to FIG. 5, which schematically a communication scheme utilizing a suspension mechanism, in accordance with some demonstrative embodiments. For example, device 102 (FIG. 1) and/or device 140 (FIG. 1) may be configured to perform one or more communications and/or operations according to the communication scheme of FIG. 5.

As shown in FIG. 5, an AP MLD 531 may include one or more APs, e.g., including an AP 535 and an AP 537. In one example, AP MLD 131 (FIG. 1) may perform one or more operations of, one or more functionalities of, the role of, and/or the functionality of, AP MLD 531.

As shown in FIG. 5, a non-AP MLD 551, e.g., a STA MLD, may include one or more non-AP STAs, e.g., including a STA 555 and a STA 557. In one example, non-AP MLD 151 (FIG. 1) may perform one or more operations of, one or more functionalities of, the role of, and/or the functionality of, non-AP MLD 551.

As shown in FIG. 5, AP MLD 531 may be configured to communicate with non-AP MLD 551 over one or more wireless communication channels.

In some demonstrative aspects, AP 535 may be configured to communicate with STA 555 over a first wireless communication channel, e.g., a main channel, and AP 537 may be configured to communicate with STA 557 over a second wireless communication channel, e.g., an ULL channel.

In some demonstrative aspects, AP MLD 531 may be configured to communicate a suspend request (SR) 585 by AP 537 over the second wireless communication channel, for example, during an ongoing communication between AP 535 and STA 555 over the first wireless communication channel, e.g., as described below.

In some demonstrative aspects, suspend request 585 may be configured to request suspension of the ongoing communication between AP 535 and STA 555.

In some demonstrative aspects, as shown in FIG. 5, the ongoing communication between AP 535 and STA 555 may include an UL transmission 562 from STA 555 to AP 535 over the first wireless communication channel.

In some demonstrative aspects, as shown in FIG. 5, AP 537 may be configured to transmit suspend request 585 to STA 557, e.g., as described below.

In some demonstrative aspects, suspend request 585 may be configured to indicate a request from AP MLD 531 to non-AP MLD 551 to suspend the UL transmission 562 from STA 555 to AP 535.

In some demonstrative aspects, STA MLD 551 may be configured to suspend the UI transmission 562 over the first wireless communication channel, for example, for a suspension period 565.

In some demonstrative aspects, AP MLD 531 may be configured to communicate a frame, e.g., a time critical (TC) data packet 595, between AP 535 and STA 557 over the first wireless communication channel, for example, during suspension period 565, e.g., as described below.

In some demonstrative aspects, TC data packet 595 may include a DL transmission, e.g., an unscheduled and/or urgent data transmission, from AP 535 to STA 557.

In some demonstrative aspects, STA MLD 551 may be configured to resume UL transmission 562 from STA 555 to AP 535, for example, after the suspension period 565.

In some demonstrative aspects, for example, in some use cases, implementations, scenarios, and/or deployments, for example, a delayed ACK mechanism may be implemented, for example, in case a transmission of a first STA, e.g., the UL transmission 562 from the STA 555, was preempted for transmission by an AP, e.g., the AP 535, to a second STA.

For example, AP 535 may be configured to send a trigger frame to the second STA on the ULL channel, for example, to trigger transmission from the second STA, for example, on the ULL channel.

For example, AP 535 may be configured to send the trigger frame to the second STA on the ULL channel, for example, after, e.g., immediately after, STA 555, which was using the main channel, completes its UL transmission 562.

For example, AP 535 may be configured to send the trigger frame to the second STA on the ULL channel, for example, after, e.g., immediately after, the UL transmission 562, and before sending an acknowledge message, e.g., an ACK, non-ACK (NACK), or Block ACK (BA), to the STA 555. For example, the trigger frame may allocate a time period for an UL transmission from the second STA.

For example, AP 535 may be configured to send a delayed acknowledge message, e.g., a delayed ACK, NACK, or BA, to the STA 555, for example, to acknowledge the UL transmission 562, e.g., after the time allocated for the second STA expires, and the second STA completes communication on the main channel.

Referring back to FIG. 1, in some demonstrative aspects, device 102 and/or device 104 may be configured to communicate over an ULL channel, which may be allocated according to a frequency reuse scheme, e.g., as described below.

Figure 6:
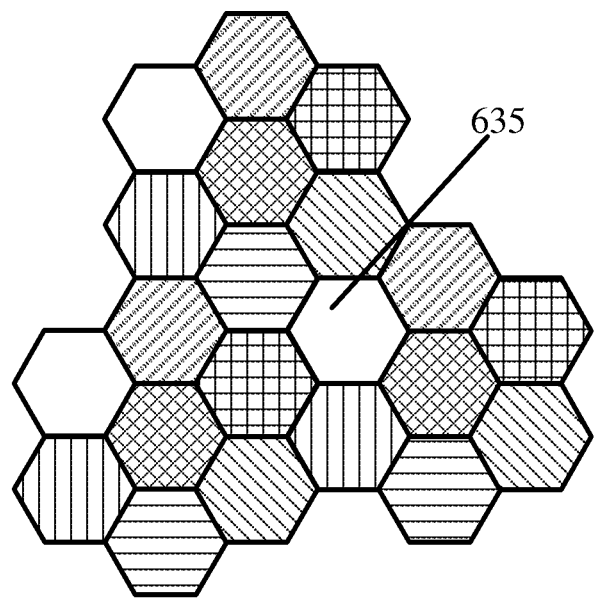
FIG. 6 is a schematic illustration of a channel allocation according to a frequency reuse scheme, in accordance with some demonstrative embodiments.
Figure 6:
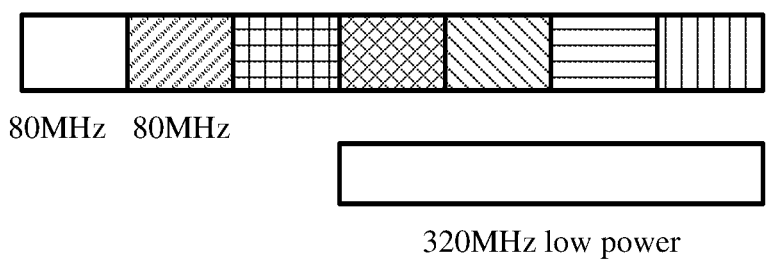

Reference is made to FIG. 6, which schematically illustrates a channel allocation according to a frequency reuse scheme, in accordance with some demonstrative embodiments. For example, device 102 (FIG. 1) and/or device 140 (FIG. 1) may be configured to perform one or more communications and/or operations according to the channel allocation of FIG. 6.

In some demonstrative aspects, as shown in FIG. 6, the channel allocation may be configured according to a frequency reuse 7 deployment of an ESS.

In some demonstrative aspects, as shown in FIG. 6, each of the APs of the ESS may be configured to utilize a different 80 MHz channel of a channel band including seven 80 Mhz channels.

In some demonstrative aspects, a channel 635, which may be on a lower part of the band, may be used as a main channel for an AP, which may be part of the ESS. In one example, AP 135 (FIG. 1) may perform one or more operations, one or more functionalities, the role of, and/or the functionality of, the AP using the channel 635.

In some demonstrative aspects, the AP 635 may be configured to select to operate an ULL radio of the AP on an ULL channel over a 320 MHz width on an upper part of the channel band.

In one example, as shown in FIG. 6, the this allocation of the ULL channel may provide a technical solution to ensure that the ULL channel has no overlap with the main 80 MHz channel 635 of the AP. For example, as shown in FIG. 6, this allocation of the ULL channel have an overlap with some of the other 80 MHz channels that are utilized by neighboring APs.

Figure 7:
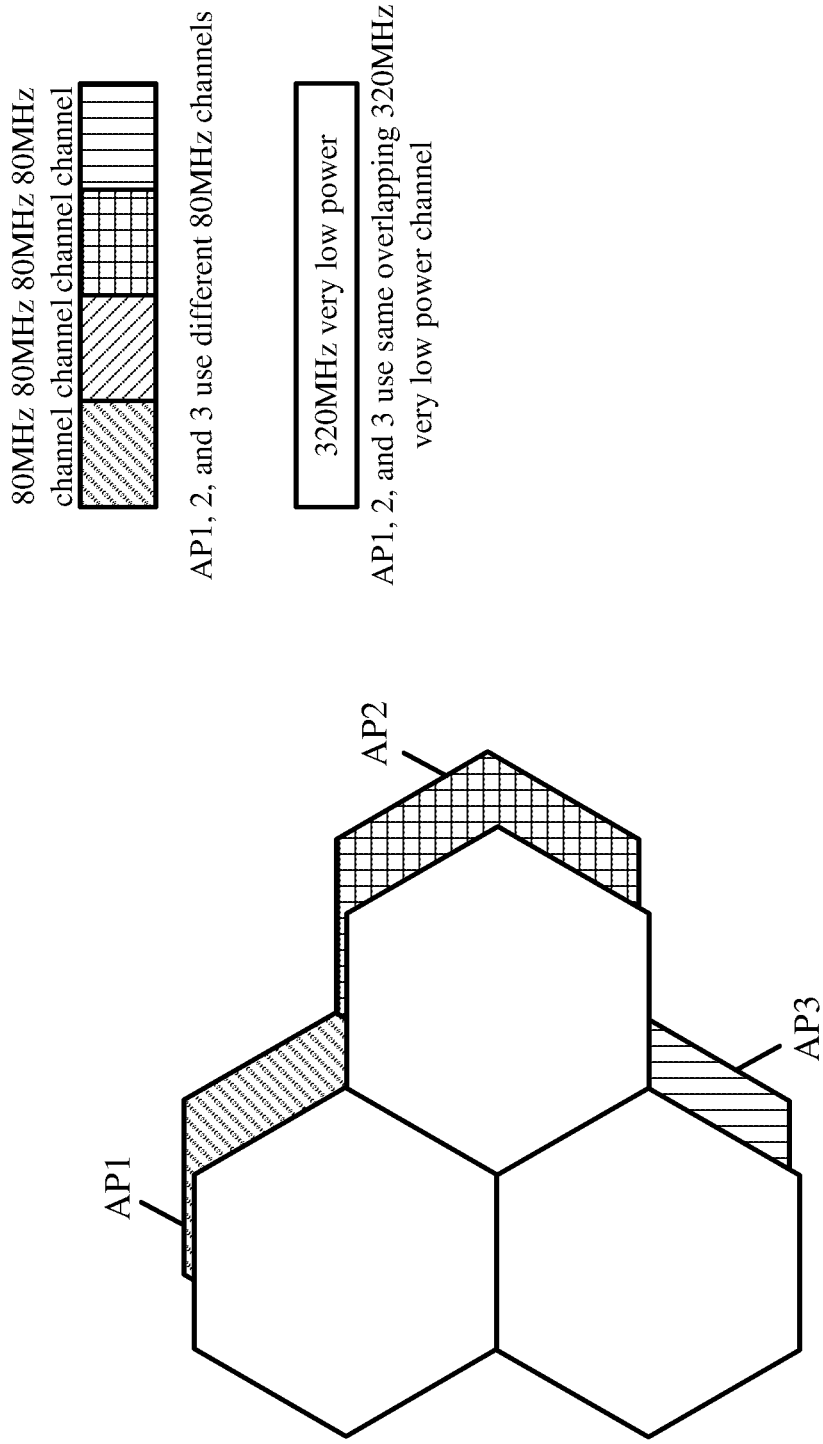
FIG. 7 is a schematic illustration of a channel allocation according to a frequency reuse scheme, in accordance with some demonstrative embodiments.

Reference is made to FIG. 7, which schematically illustrates a channel allocation according to a frequency reuse scheme, in accordance with some demonstrative embodiments. For example, device 102 (FIG. 1) and/or device 140 (FIG. 1) may be configured to perform one or more communications and/or operations according to the channel allocation of FIG. 7.

In some demonstrative aspects, as shown in FIG. 7, the channel allocation may be configured according to a frequency reuse 4 deployment of an ESS.

In some demonstrative aspects, as shown in FIG. 7, each of the APs of the ESS may be configured to utilize a different 80 MHz channel of a channel band including four 80 Mhz channels.

For example, a first AP (AP1) may be configured to operate a main channel over a first 80 MHz wireless communication channel, e.g., on a lower 80 MHz channel of the channel band; a second AP (AP2) may be configured to operate a main channel over a second 80 MHz wireless communication channel; and a third AP (AP3) may be configured to operate a main channel over a third 80 MHz wireless communication channel.

In some demonstrative aspects, an ULL AP may be configured to utilize a an ULL channel, with a wider bandwidth, e.g., a 320 MHz bandwidth. In one example, the ULL channel may overlap with all main channels of the neighboring APs.

Figure 8:
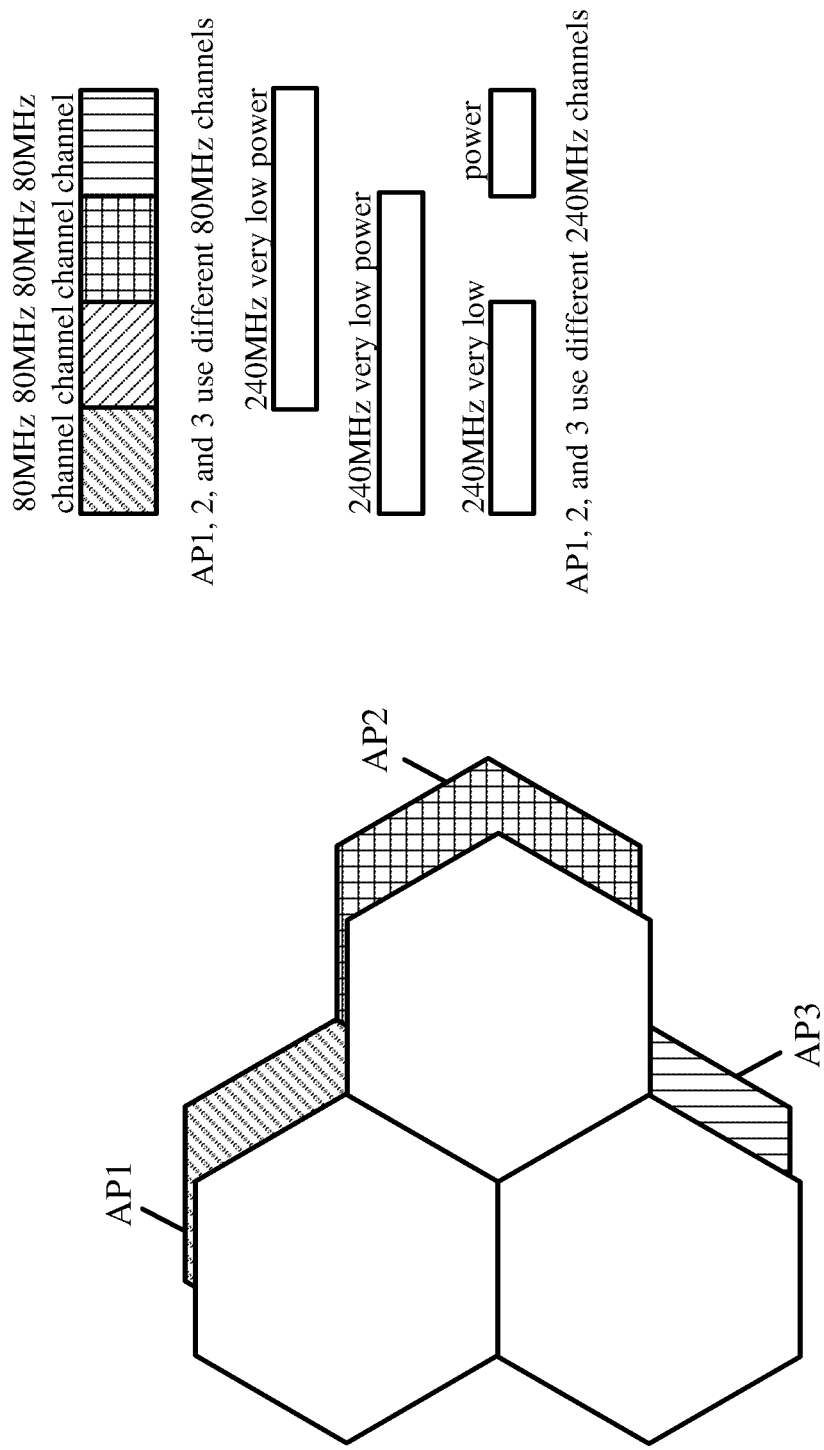
FIG. 8 is a schematic illustration of a channel allocation according to a frequency reuse scheme, in accordance with some demonstrative embodiments.

Reference is made to FIG. 8, which schematically illustrates a channel allocation according to a frequency reuse scheme, in accordance with some demonstrative embodiments. For example, device 102 (FIG. 1) and/or device 140 (FIG. 1) may be configured to perform one or more communications and/or operations according to the channel allocation of FIG. 8.

In some demonstrative aspects, as shown in FIG. 8, the channel allocation may be configured according to a frequency reuse 4 deployment of an ESS.

In some demonstrative aspects, as shown in FIG. 8, each of the APs of the ESS may be configured to utilize a different 80 MHz channel of a channel band including four 80 Mhz channels.

For example, a first AP (AP1) may be configured to operate a main channel over a first 80 MHz wireless communication channel, e.g., on a lower 80 MHz channel of the channel band; a second AP (AP2) may be configured to operate a main channel over a second 80 MHz wireless communication channel; and a third AP (AP3) may be configured to operate a main channel over a third 80 MHz wireless communication channel.

In some demonstrative aspects, as shown in FIG. 8, the ULL channel may be selected to have a partial overlap with the main channel.

In some demonstrative aspects, an ULL AP may be configured to utilize an ULL channel with a wider bandwidth, e.g., 240 MHz bandwidth. In one example, the ULL channel may be allocated to partially overlap with the main channels of the neighboring APs.

In one example, the ULL: may configure communications over the ULL channel to use very low power, for example, in order to generate as little interference as possible on the main channel of neighboring APs with which the ULL channel overlaps.

In one example, the ULL channel may be allocated in a way which may avoid interference with a closest AP, e.g., a collocated AP.

Figure 9:
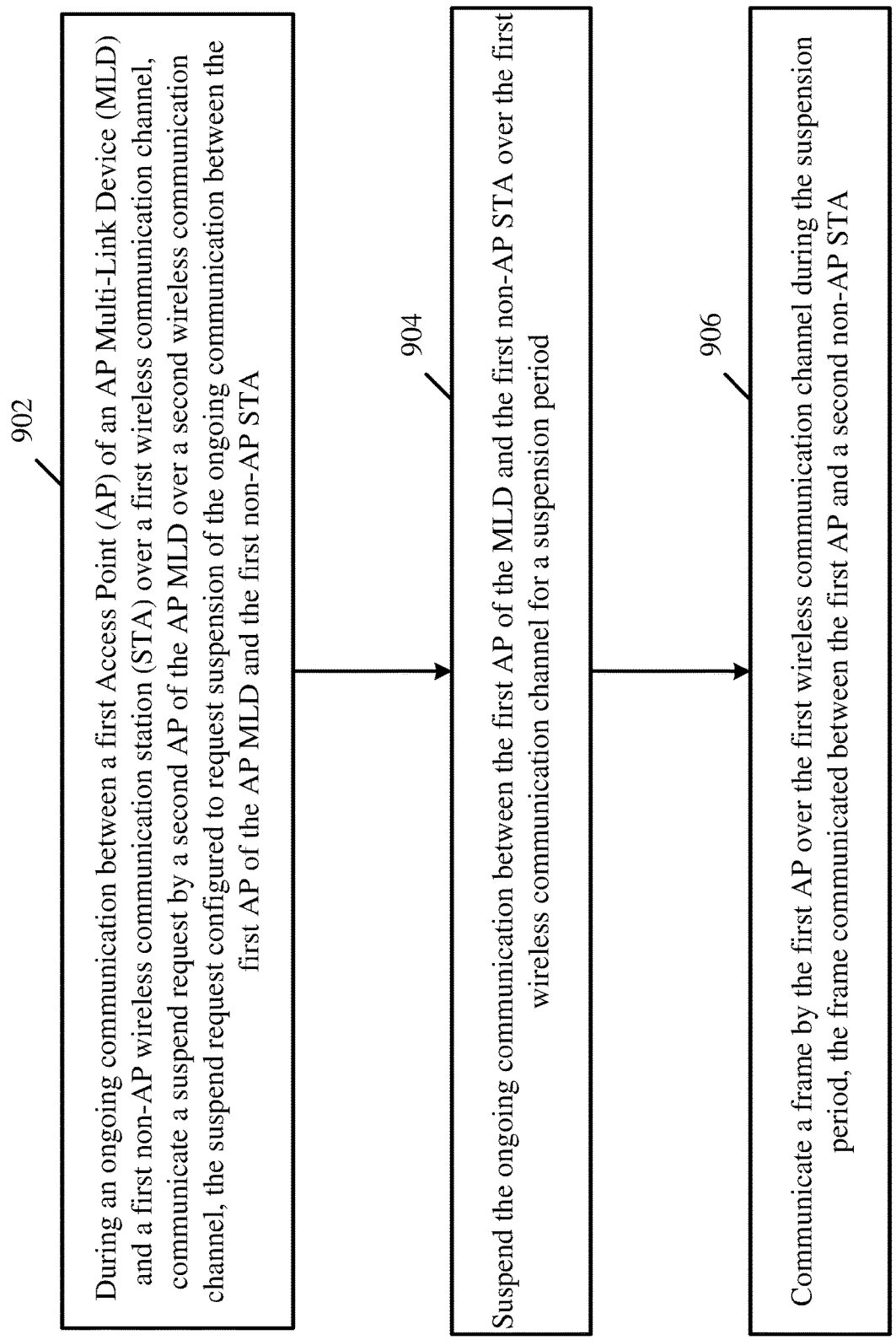
FIG. 9 is a schematic flow-chart illustration of a method of wireless communication using a suspension mechanism, in accordance with some demonstrative embodiments.

Reference is made to FIG. 9, which schematically illustrates a method of wireless communication using a suspension mechanism, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include during an ongoing communication between a first AP of an AP MLD and a first non-AP wireless communication station (STA) over a first wireless communication channel, communicating a suspend request by a second AP of the AP MLD over a second wireless communication channel, the suspend request configured to request suspension of the ongoing communication between the first AP of the AP MLD and the first non-AP STA. For example, controller 124 (FIG. 1) may be configured to cause, trigger, and/or control AP MLD 131 (FIG. 1) to communicate a suspend request by AP 137 (FIG. 1) over the second wireless communication channel, during an ongoing AP communication between AP 135 (FIG. 1) and a first non-AP STA over the first wireless communication channel, e.g., as described above.

As indicated at block 904, the method may include suspending the ongoing communication between the first AP of the MLD and the first non-AP STA over the first wireless communication channel for a suspension period. For example, controller 124 (FIG. 1) may be configured to cause, trigger, and/or control AP MLD 131 (FIG. 1) to suspend the ongoing communication between AP 135 (FIG. 1) and the first non-AP STA over the first wireless communication channel for the suspension period, e.g., as described above.

As indicated at block 906, the method may include communicating a frame by the first AP of the AP MLD over the first wireless communication channel during the suspension period, the frame communicated between the first AP and a second non-AP STA. For example, controller 124 (FIG. 1) may be configured to cause, trigger, and/or control AP MLD 131 (FIG. 1) to communicate a frame between AP 135 (FIG. 1) and the second non-AP STA over the first wireless communication channel during the suspension period, e.g., as described above.

Figure 10:
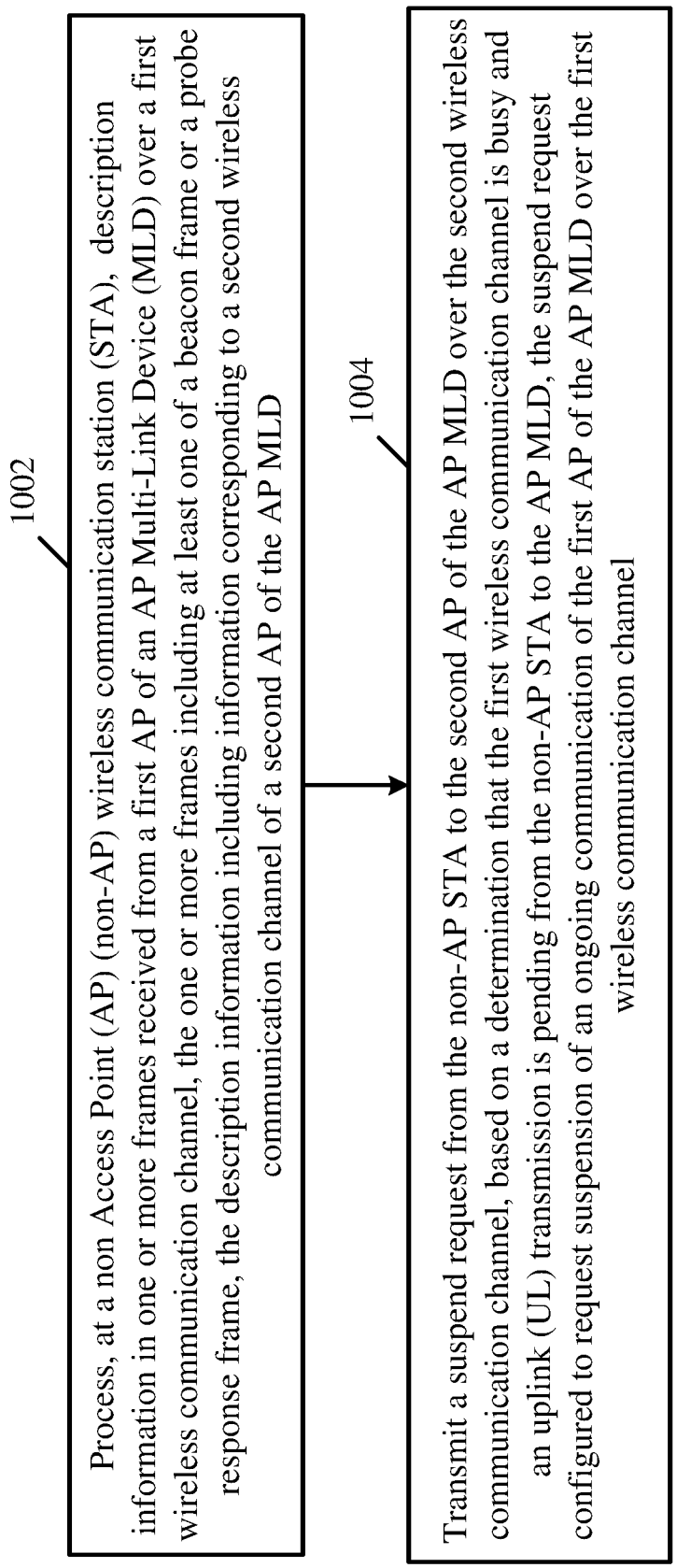
FIG. 10 is a schematic flow-chart illustration of a method of wireless communication using a suspension mechanism, in accordance with some demonstrative embodiments.

Reference is made to FIG. 10, which schematically illustrates a method of wireless communication using a suspension mechanism, in accordance with some demonstrative embodiments. For example, one or more of the operations of the method of FIG. 10 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include processing at a non-AP STA description information in one or more frames received from a first AP of an AP MLD over a first wireless communication channel, the one or more frames including at least one of a beacon frame or a probe response frame, the description information including information corresponding to a second wireless communication channel of a second AP of the AP MLD. For example, controller 154 (FIG. 1) may be configured to cause, trigger, and/or control device 140 (FIG. 1) to process description information in one or more frames received from AP 135 (FIG. 1) over the first wireless communication channel, e.g., as described above.

As indicated at block 1004, the method may include transmitting a suspend request from the non-AP STA to the second AP of the AP MLD over the second wireless communication channel, for example, based on a determination that the first wireless communication channel is busy and an UL transmission is pending from the non-AP STA to the AP MLD. For example, the suspend request may be configured to request suspension of an ongoing communication of the first AP of the AP MLD over the first wireless communication channel. For example, controller 154 (FIG. 1) may be configured to cause, trigger, and/or control device 140 (FIG. 1) to transmit a suspend request to AP 137 (FIG. 1) over the second wireless communication channel, for example, based on a determination that the first wireless communication channel is busy and an UL transmission is pending from device 140 (FIG. 1) to AP MLD 131 (FIG. 1), e.g., as described above.

Figure 11:
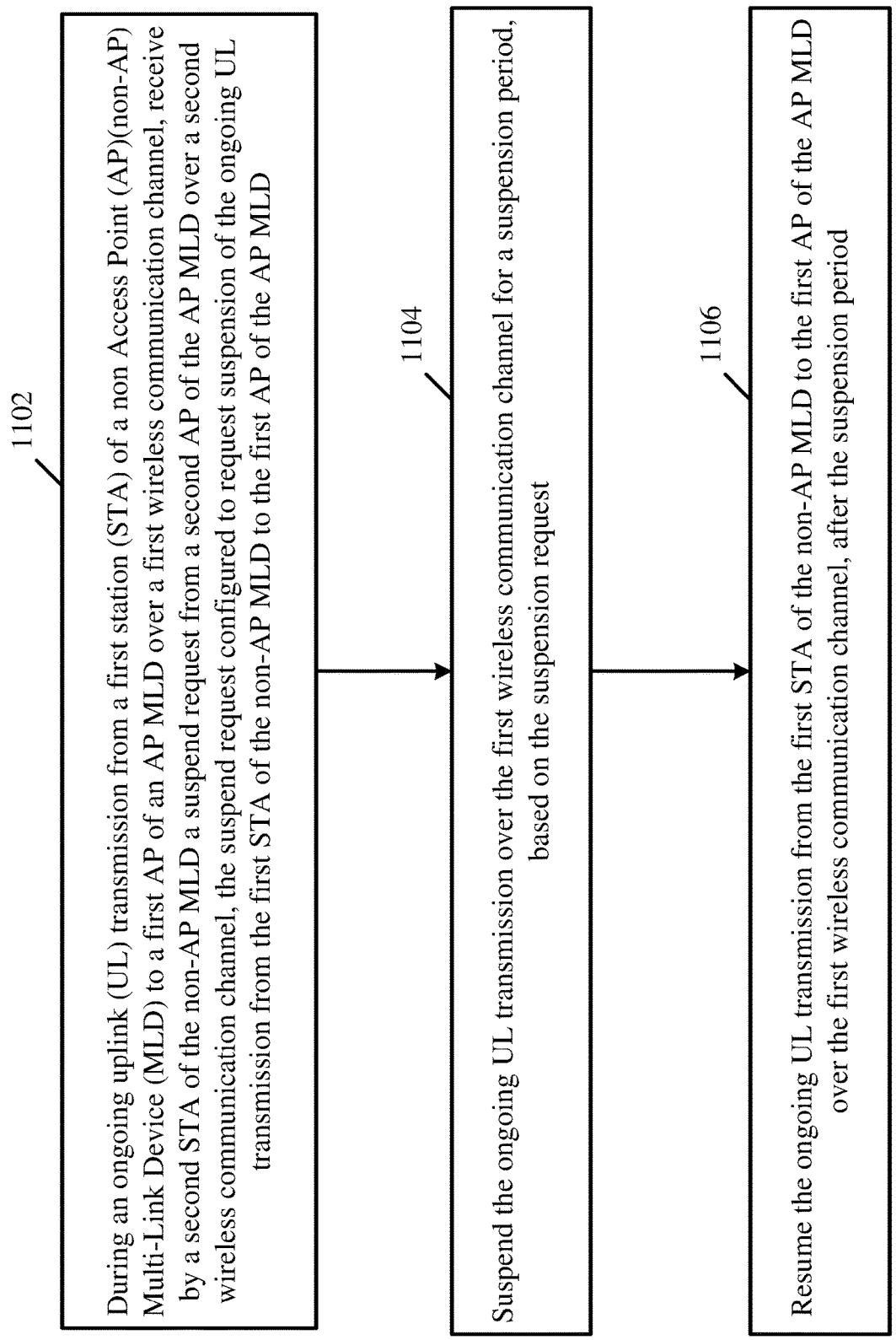
FIG. 11 is a schematic flow-chart illustration of a method of wireless communication using a suspension mechanism, in accordance with some demonstrative embodiments.

Reference is made to FIG. 11, which schematically illustrates a method of wireless communication using a suspension mechanism, in accordance with some demonstrative embodiments. For example, one or more of the operations of the method of FIG. 11 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1102, the method may include, during an ongoing UL transmission from a first STA of a non-AP MLD to a first AP of an AP MLD over a first wireless communication channel, receiving by a second STA of the non-AP MLD a suspend request from a second AP of the AP MLD over a second wireless communication channel, the suspend request configured to request suspension of the ongoing UL transmission from the first STA of the non-AP MLD to the first AP of the AP MLD. For example, controller 154 (FIG. 1) may be configured to cause, trigger, and/or control non-AP MLD 151 (FIG. 1) to receive by STA 157 (FIG. 1) a suspend request from AP 137 (FIG. 1) over the second wireless communication channel, for example, during an ongoing UL transmission from STA 155 (FIG. 1) to AP 135 (FIG. 1) over the first wireless communication channel, e.g., as described above.

As indicated at block 1104, the method may include suspending the ongoing UL transmission over the first wireless communication channel for a suspension period, for example, based on the suspension request. For example, controller 154 (FIG. 1) may be configured to cause, trigger, and/or control non-AP MLD 151 (FIG. 1) to suspend the ongoing UL transmission over the first wireless communication channel for the suspension period, for example, based on the suspension request, e.g., as described above.

As indicated at block 1106, the method may include resuming the ongoing UL transmission from the first STA of the non-AP MLD to the first AP of the AP MLD over the first wireless communication channel, for example, after the suspension period. For example, controller 154 (FIG. 1) may be configured to cause, trigger, and/or control non-AP MLD 151 (FIG. 1) to resume the ongoing UL transmission from STA 155 (FIG. 1) to AP 135 (FIG. 1) over the first wireless communication channel, for example, after the suspension period, e.g., as described above.

Figure 12:
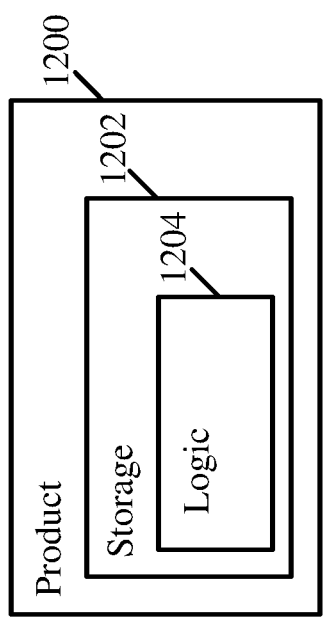
FIG. 12 is a schematic illustration of a product of manufacture, in accordance with some demonstrative embodiments.

Reference is made to FIG. 12, which schematically illustrates a product of manufacture 1200, in accordance with some demonstrative embodiments. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at device 102 (FIG. 1), device 140 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), controller 124 (FIG. 1), controller 154 (FIG. 1), message processor 128

(FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1, 2, 3, 4, 5, 6, 7, 8, 9, 10, and/or 11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1200 and/or machine readable storage media 1202 may include one or more types of computer-readable storage media capable of storing data, including volatile memory, non-volatile memory, removable or non-removable memory, erasable or non-erasable memory, writeable or re-writeable memory, and the like. For example, machine readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further embodiments.

Example 1 includes an apparatus comprising logic and circuitry configured to cause an Access Point (AP) Multi-Link Device (MLD) to during an ongoing communication between a first AP of the AP MLD and a first non-AP wireless communication station (STA) over a first wireless communication channel, communicate a suspend request by a second AP of the AP MLD over a second wireless communication channel, the suspend request configured to request suspension of the ongoing communication between the first AP of the AP MLD and the first non-AP STA; suspend the ongoing communication between the first AP of the MLD and the first non-AP STA over the first wireless communication channel for a suspension period; and communicate a frame by the first AP over the first wireless communication channel during the suspension period, the frame communicated between the first AP and a second non-AP STA.

Example 2 includes the subject matter of Example 1, and optionally, wherein the suspend request comprises a received suspend request received by the second AP of the AP MLD from the second non-AP STA, the received suspend request configured to indicate a request from the second non-AP STA to transmit an uplink (UL) transmission to the AP MLD.

Example 3 includes the subject matter of Example 2, and optionally, wherein the received suspend request comprises an urgent UL request configured to indicate a request from the second non-AP STA to transmit an urgent UL transmission to the AP MLD.

Example 4 includes the subject matter of Example 2 or 3, and optionally, wherein the apparatus is configured to cause the AP MLD to transmit a Trigger Frame (TF) from the first AP of the AP MLD to the second non-AP STA over the first wireless communication channel during the suspension period, the TF configured to trigger the UL transmission from the second non-AP STA during the suspension period.

Example 5 includes the subject matter of any one of Examples 2-4, and optionally, wherein the ongoing communication between the first AP of the AP MLD and the first non-AP STA comprises a downlink (DL) transmission from the first AP of the AP MLD to the first non-AP STA over the first wireless communication channel.

Example 6 includes the subject matter of Example 5, and optionally, wherein the apparatus is configured to cause the AP MLD to resume the DL transmission from the first AP of the AP MLD to the first non-AP STA after the suspension period.

Example 7 includes the subject matter of any one of Examples 2-6, and optionally, wherein the apparatus is configured to cause the AP MLD to operate the second AP of the AP MLD to monitor the second wireless communication channel for detection of the suspend request during the ongoing communication between the first AP of the AP MLD and the first non-AP STA over the first wireless communication channel.

Example 8 includes the subject matter of Example 1, and optionally, wherein the suspend request comprises a transmitted suspend request to indicate a request from the AP MLD to a non-AP MLD to suspend an uplink (UL) transmission from a first STA of the non-AP MLD to the first AP of the AP MLD, the transmitted suspend request transmitted by the second AP of the AP MLD to a second STA of the non-AP MLD.

Example 9 includes the subject matter of Example 8, and optionally, wherein the apparatus is configured to cause the AP MLD to transmit a downlink (DL) transmission comprising the frame from the first AP of the AP MLD to the second non-AP STA over the first wireless communication channel during the suspension period.

Example 10 includes the subject matter of Example 9, and optionally, wherein the second non-AP STA comprises a STA of the non-AP MLD.

Example 11 includes the subject matter of Example 9, and optionally, wherein the second non-AP STA comprises a STA, which is not part of the non-AP MLD.

Example 12 includes the subject matter of any one of Examples 8-11, and optionally, wherein the apparatus is configured to cause the AP MLD to resume reception of the UL transmission from the first STA of the non-AP MLD after the suspension period.

Example 13 includes the subject matter of Example 12, and optionally, wherein the apparatus is configured to cause the AP MLD to transmit a trigger frame from the first AP of the AP MLD to the second non-AP STA after the UL transmission from the first STA of the non-AP MLD, the trigger frame to trigger an acknowledgment (ACK) from the second non-AP STA, the ACK to acknowledge the DL transmission from the first AP of the AP MLD to the second non-AP STA.

Example 14 includes the subject matter of Example 13, and optionally, wherein the apparatus is configured to cause the AP MLD to transmit a delayed ACK from the first AP of the AP MLD to the first STA of the non-AP MLD after the ACK from the second non-AP STA, the delayed ACK from the first AP of the AP MLD to acknowledge the UL transmission from the first STA of the non-AP MLD.

Example 15 includes the subject matter of any one of Examples 8-14, and optionally, wherein the apparatus is configured to cause the AP MLD to transmit the transmitted suspend request from the second AP of the AP MLD according to a non-contention mechanism, which is configured to allow transmission over the second wireless communication channel with no contention.

Example 16 includes the subject matter of any one of Examples 1-15, and optionally, wherein the apparatus is configured to cause the AP MLD to prohibit transmission of beacon frames and probe response frames from the second AP of the AP MLD over the second wireless communication channel.

Example 17 includes the subject matter of any one of Examples 1-16, and optionally, wherein the apparatus is configured to cause the AP MLD to include description information in one or more frames transmitted by the first AP of the AP MLD over the first wireless communication channel, the one or more frames comprising at least one of a beacon frame or a probe response frame, the description information comprising at least one of information corresponding to the second AP of the AP MLD or information corresponding to the second wireless communication channel.

Example 18 includes the subject matter of Example 17, and optionally, wherein the description information comprises an indication of one or more rules for communication with the second AP of the AP MLD over the second wireless communication channel.

Example 19 includes the subject matter of Example 17 or 18, and optionally, wherein the description information comprises an indication of one or more types of frames allowed for transmission to the second AP of the AP MLD over the second wireless communication channel.

Example 20 includes the subject matter of any one of Examples 1-19, and optionally, wherein the apparatus is configured to cause the AP MLD to set the second wireless communication channel based on the first wireless communication channel and one or more wireless communication channels of one or more neighbor APs.

Example 21 includes the subject matter of any one of Examples 1-20, and optionally, wherein the apparatus is configured to cause the AP MLD to set the second wireless communication channel to overlap with a wireless communication channel of a neighbor AP in a same Extended Service Set (ESS) as the first AP of the AP MLD.

Example 22 includes the subject matter of any one of Examples 1-21, and optionally, wherein the second wireless communication channel has no overlap with the first wireless communication channel.

Example 23 includes the subject matter of any one of Examples 1-22, and optionally, wherein the second AP of the AP MLD comprises an Ultra-Low Latency (ULL) AP, and the second wireless communication channel comprises an ULL channel restricted to ULL communications.

Example 24 includes the subject matter of any one of Examples 1-23, and optionally, comprising a first radio to communicate over the first wireless communication channel, and a second radio to communicate over the second wireless communication channel.

Example 25 includes the subject matter of Example 24, and optionally, comprising one or more antennas connected to the first radio and the second radio, and a processor to execute instructions of an operating system of the AP MLD.

Example 26 includes an apparatus comprising logic and circuitry configured to cause a non Access Point (AP) (non-AP) wireless communication station (STA) to process description information in one or more frames received from a first AP of an AP Multi-Link Device (MLD) over a first wireless communication channel, the one or more frames comprising at least one of a beacon frame or a probe response frame, the description information comprising information corresponding to a second wireless communication channel of a second AP of the AP MLD; and based on a determination that the first wireless communication channel is busy and an uplink (UL) transmission is pending from the non-AP STA to the AP MLD, transmit a suspend request from the non-AP STA to the second AP of the AP MLD over the second wireless communication channel, the suspend request configured to request suspension of an ongoing communication of the first AP of the AP MLD over the first wireless communication channel.

Example 27 includes the subject matter of Example 26, and optionally, wherein the suspend request comprises an urgent UL request configured to indicate a request from the non-AP STA to transmit an urgent UL transmission to the AP MLD.

Example 28 includes the subject matter of Example 26 or 27, and optionally, wherein the apparatus is configured to cause the non-AP STA to process a Trigger Frame (TF) received from the first AP of the AP MLD over the first wireless communication channel after the suspend request, and, based on the TF, to transmit the UL transmission to the first AP of the AP MLD.

Example 29 includes the subject matter of any one of Examples 26-28, and optionally, wherein the apparatus is configured to restrict the non-AP STA to transmit to the second AP of the AP MLD over the second wireless communication channel only according to one or more rules for communication with the second AP of the AP MLD over the second wireless communication channel, the one or more rules indicated by the description information.

Example 30 includes the subject matter of any one of Examples 26-29, and optionally, wherein the apparatus is configured to cause the non-AP STA to transmit the suspend request to the second AP of the AP MLD according to a non-contention mechanism, which is configured to allow transmission over the second wireless communication channel with no contention.

Example 31 includes the subject matter of any one of Examples 26-29, and optionally, wherein the apparatus is configured to cause the non-AP STA to transmit the suspend request to the second AP of the AP MLD according to a contention mechanism, which is configured to provide access to the second wireless communication channel with a delay of no more than 10 microseconds.

Example 32 includes the subject matter of any one of Examples 26-31, and optionally, wherein the second wireless communication channel has no overlap with the first wireless communication channel.

Example 33 includes the subject matter of any one of Examples 26-32, and optionally, wherein the second wireless communication channel comprises an Ultra-Low Latency (ULL) channel restricted to ULL communications.

Example 34 includes the subject matter of any one of Examples 26-33, and optionally, comprising at least one radio to communicate over the first wireless communication channel and the second wireless communication channel.

Example 35 includes the subject matter of Example 34, and optionally, comprising one or more antennas connected to the radio, and a processor to execute instructions of an operating system of the non-AP STA.

Example 36 includes an apparatus comprising logic and circuitry configured to cause a non Access Point (AP) (non-AP) Multi-Link Device (MLD) to during an ongoing uplink (UL) transmission from a first station (STA) of the non-AP MLD to a first AP of an AP MLD over a first wireless communication channel, receive by a second STA of the non-AP MLD a suspend request from a second AP of the AP MLD over a second wireless communication channel, the suspend request configured to request suspension of the ongoing UL transmission from the first STA of the non-AP MLD to the first AP of the AP MLD; based on the suspension request, suspend the ongoing UL transmission over the first wireless communication channel for a suspension period; and after the suspension period, resume the ongoing UL transmission from the first STA of the non-AP MLD to the first AP of the AP MLD over the first wireless communication channel.

Example 37 includes the subject matter of Example 36, and optionally, wherein the apparatus is configured to cause the non-AP MLD to process a downlink (DL) transmission from the AP MLD during the suspension period.

Example 38 includes the subject matter of Example 37, and optionally, wherein the DL transmission comprises a DL transmission from the first AP of the AP MLD to the first STA of the non-AP MLD over the first wireless communication channel.

Example 39 includes the subject matter of any one of Examples 36-38, and optionally, wherein the apparatus is configured to cause the non-AP MLD to process a delayed acknowledgment (ACK) from the first AP of the AP MLD over the first wireless communication channel, the delayed ACK from the first AP of the AP MLD to acknowledge the UL transmission from the first STA of the non-AP MLD.

Example 40 includes the subject matter of any one of Examples 36-39, and optionally, wherein the apparatus is configured to cause the non-AP MLD to operate the second STA of the non-AP MLD to monitor the second wireless communication channel for detection of the suspend request during the ongoing UL transmission over the first wireless communication channel.

Example 41 includes the subject matter of any one of Examples 36-40, and optionally, wherein the apparatus is configured to cause the non-AP MLD to prohibit transmission of probe request frames from the second STA of the non-AP MLD over the second wireless communication channel.

Example 42 includes the subject matter of any one of Examples 36-41, and optionally, wherein the apparatus is configured to cause the non-AP MLD to prohibit transmission of pre-association frames from the second STA of the non-AP MLD to the second AP of the AP MLD over the second wireless communication channel.

Example 43 includes the subject matter of any one of Examples 36-42, and optionally, wherein the second wireless communication channel has no overlap with the first wireless communication channel.

Example 44 includes the subject matter of any one of Examples 36-43, and optionally, wherein the second wireless communication channel comprises an Ultra-Low Latency (ULL) channel restricted to ULL communications.

Example 45 includes the subject matter of any one of Examples 36-44, and optionally, comprising a first radio to communicate over the first wireless communication channel, and a second radio to communicate over the second wireless communication channel.

Example 46 includes the subject matter of Example 45, and optionally, comprising one or more antennas connected to the first radio and the second radio, and a processor to execute instructions of an operating system of the non-AP MLD.

Example 47 comprises a wireless communication device comprising the apparatus of any one of Examples 1-46.

Example 48 comprises an apparatus comprising means for executing any of the described operations of any one of Examples 1-46.

Example 49 comprises a product comprising one or more tangible computer-readable non-transitory storage media comprising computer-executable instructions operable to, when executed by at least one processor, enable the at least one processor to cause a computing device to perform any of the described operations of any one of Examples 1-46.

Example 50 comprises an apparatus comprising: a memory interface; and processing circuitry configured to: perform any of the described operations of any one of Examples 1-46.

Example 51 comprises a method comprising any of the described operations of any one of Examples 1-46.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) Multi-Link Device (MLD) to:
during an ongoing communication between a first AP of the AP MLD and a first non-AP wireless communication station (STA) over a first wireless communication channel, communicate a suspend request by a second AP of the AP MLD over a second wireless communication channel, the suspend request configured to request suspension of the ongoing communication between the first AP of the AP MLD and the first non-AP STA;

suspend the ongoing communication between the first AP of the MLD and the first non-AP STA over the first wireless communication channel for a suspension period; and communicate a frame by the first AP over the first wireless communication channel during the suspension period, the frame communicated between the first AP and a second non-AP STA.

2. The apparatus of claim 1, wherein the suspend request comprises a received suspend request received by the second AP of the AP MLD from the second non-AP STA, the received suspend request configured to indicate a request from the second non-AP STA to transmit an uplink (UL) transmission to the AP MLD.

3. The apparatus of claim 2, wherein the received suspend request comprises an urgent UL request configured to indicate a request from the second non-AP STA to transmit an urgent UL transmission to the AP MLD.

4. The apparatus of claim 2 configured to cause the AP MLD to transmit a Trigger Frame (TF) from the first AP of the AP MLD to the second non-AP STA over the first wireless communication channel during the suspension period, the TF configured to trigger the UL transmission from the second non-AP STA during the suspension period.

5. The apparatus of claim 2, wherein the ongoing communication between the first AP of the AP MLD and the first non-AP STA comprises a downlink (DL) transmission from the first AP of the AP MLD to the first non-AP STA over the first wireless communication channel.

6. The apparatus of claim 5 configured to cause the AP MLD to resume the DL transmission from the first AP of the AP MLD to the first non-AP STA after the suspension period.

7. The apparatus of claim 2 configured to cause the AP MLD to operate the second AP of the AP MLD to monitor the second wireless communication channel for detection of the suspend request during the ongoing communication between the first AP of the AP MLD and the first non-AP STA over the first wireless communication channel.

8. The apparatus of claim 1, wherein the suspend request comprises a transmitted suspend request to indicate a request from the AP MLD to a non-AP MLD to suspend an uplink (UL) transmission from a first STA of the non-AP MLD to the first AP of the AP MLD, the transmitted suspend request transmitted by the second AP of the AP MLD to a second STA of the non-AP MLD.

9. The apparatus of claim 8 configured to cause the AP MLD to transmit a downlink (DL) transmission comprising the frame from the first AP of the AP MLD to the second non-AP STA over the first wireless communication channel during the suspension period.

10. The apparatus of claim 8 configured to cause the AP MLD to resume reception of the UL transmission from the first STA of the non-AP MLD after the suspension period.

11. The apparatus of claim 8 configured to cause the AP MLD to transmit the transmitted suspend request from the second AP of the AP MLD according to a non-contention mechanism, which is configured to allow transmission over the second wireless communication channel with no contention.

12. The apparatus of claim 1 configured to cause the AP MLD to prohibit transmission of beacon frames and probe response frames from the second AP of the AP MLD over the second wireless communication channel.

13. The apparatus of claim 1 configured to cause the AP MLD to include description information in one or more frames transmitted by the first AP of the AP MLD over the first wireless communication channel, the one or more frames comprising at least one of a beacon frame or a probe response frame, the description information comprising at least one of information corresponding to the second AP of the AP MLD or information corresponding to the second wireless communication channel.

14. The apparatus of claim 13, wherein the description information comprises an indication of one or more rules for communication with the second AP of the AP MLD over the second wireless communication channel.

15. The apparatus of claim 13, wherein the description information comprises an indication of one or more types of frames allowed for transmission to the second AP of the AP MLD over the second wireless communication channel.

16. The apparatus of claim 1 configured to cause the AP MLD to set the second wireless communication channel based on the first wireless communication channel and one or more wireless communication channels of one or more neighbor APs.

17. The apparatus of claim 1, wherein the second wireless communication channel has no overlap with the first wireless communication channel.

18. The apparatus of claim 1, wherein the second AP of the AP MLD comprises an Ultra-Low Latency (ULL) AP, and the second wireless communication channel comprises an ULL channel restricted to ULL communications.

19. The apparatus of claim 1 comprising a first radio to communicate over the first wireless communication channel, and a second radio to communicate over the second wireless communication channel.

20. The apparatus of claim 19 comprising one or more antennas connected to the first radio and the second radio, and a processor to execute instructions of an operating system of the AP MLD.

21. An apparatus comprising logic and circuitry configured to cause a non Access Point (AP) (non-AP) wireless communication station (STA) to:

process description information in one or more frames received from a first AP of an AP Multi-Link Device (MLD) over a first wireless communication channel, the one or more frames comprising at least one of a beacon frame or a probe response frame, the description information comprising information corresponding to a second wireless communication channel of a second AP of the AP MLD; and based on a determination that the first wireless communication channel is busy and an uplink (UL) transmission is pending from the non-AP STA to the AP MLD, transmit a suspend request from the non-AP STA to the second AP of the AP MLD over the second wireless communication channel, the suspend request configured to request suspension of an ongoing communication of the first AP of the AP MLD over the first wireless communication channel.

22. The apparatus of claim 21, wherein the suspend request comprises an urgent UL request configured to indicate a request from the non-AP STA to transmit an urgent UL transmission to the AP MLD.

23. A product comprising one or more tangible computer-readable non-transitory storage media comprising computer-executable instructions operable to, when executed by at least one processor, enable the at least one processor to cause a non Access Point (AP) (non-AP) Multi-Link Device (MLD) to:

during an ongoing uplink (UL) transmission from a first station (STA) of the non-AP MLD to a first AP of an AP MLD over a first wireless communication channel, receive by a second STA of the non-AP MLD a suspend request from a second AP of the AP MLD over a second wireless communication channel, the suspend request configured to request suspension of the ongoing UL transmission from the first STA of the non-AP MLD to the first AP of the AP MLD;

based on the suspension request, suspend the ongoing UL transmission over the first wireless communication channel for a suspension period; and after the suspension period, resume the ongoing UL transmission from the first STA of the non-AP MLD to the first AP of the AP MLD over the first wireless communication channel.

24. The product of claim 23, wherein the instructions, when executed, cause the non-AP MLD to process a downlink (DL) transmission from the AP MLD during the suspension period.

25. The product of claim 23, wherein the instructions, when executed, cause the non-AP MLD to operate the second STA of the non-AP MLD to monitor the second wireless communication channel for detection of the suspend request during the ongoing UL transmission over the first wireless communication channel.

* * * * *